US010834694B2

(12) United States Patent
Sandgren et al.

(10) Patent No.: US 10,834,694 B2
(45) Date of Patent: Nov. 10, 2020

(54) FLEXIBLE SELECTION OF TIMING ADVANCE CONTROL METHOD FOR SUPPLEMENTARY UPLINK CONNECTIONS

(71) Applicant: Telefonaktiebolaget LM Ericsson (publ), Stockholm (SE)

(72) Inventors: Magnus Sandgren, Staffanstorp (SE); Robert Baldemair, Solna (SE); Torgny Palenius, Barsebäck (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/341,506

(22) PCT Filed: Mar. 26, 2019

(86) PCT No.: PCT/EP2019/057629
§ 371 (c)(1),
(2) Date: Apr. 12, 2019

(87) PCT Pub. No.: WO2019/192900
PCT Pub. Date: Oct. 10, 2019

(65) Prior Publication Data
US 2019/0313356 A1 Oct. 10, 2019

Related U.S. Application Data

(60) Provisional application No. 62/652,721, filed on Apr. 4, 2018.

(51) Int. Cl.
*H04W 56/00* (2009.01)
*H04W 76/15* (2018.01)
*H04L 27/26* (2006.01)

(52) U.S. Cl.
CPC ..... *H04W 56/0045* (2013.01); *H04L 27/2666* (2013.01); *H04L 27/2678* (2013.01); *H04L 27/2688* (2013.01); *H04W 76/15* (2018.02)

(58) Field of Classification Search
CPC ............. H04W 56/0045; H04W 76/15; H04L 27/2666; H04L 27/2678; H04L 27/2688
See application file for complete search history.

(56) References Cited

U.S. PATENT DOCUMENTS 9,144,016 B2 9/2015 Frenger et al.
9,756,593 B2 * 9/2017 Axmon ............. H04W 72/0446
2015/0327198 A1 11/2015 Axmon et al.

OTHER PUBLICATIONS

"3GPP TS 38.300 V15.1.0"; 3rd Generation Partnership Project; Technical Specification Group Radio Access Network; NR; NR and NG-RAN Overall Description; Stage 2 (Release 15); Mar. 2018, pp. 1-71.

(Continued)

*Primary Examiner* — Chandrahas B Patel
(74) *Attorney, Agent, or Firm* — Murphy, Bilak & Homiller, PLLC

(57) ABSTRACT

Exemplary embodiments include methods for adjusting transmission timing of a wireless communication device (UE) operating in a network including first and second base stations (BS). The methods include determining a first allowable timing adjustment range corresponding to an uplink (UL) connection between the UE and the first BS, and determining a second allowable timing adjustment range corresponding to a supplementary uplink (SUL) connection between the UE and the second BS. The SUL connection is not associated with a DL connection between the UE and the second BS. The methods include determining if a single timing advance (TA) value can be used to adjust the UE's transmission timing to satisfy both the first and second ranges, and performing a corrective action if it is determined that a single TA value cannot be used. Embodiments also include first and second BS, and UEs, configured to perform the exemplary methods.

30 Claims, 11 Drawing Sheets

(56) References Cited

OTHER PUBLICATIONS

"Discussion on remaining SUL issues for EN-DC", 3GPP TSG-RAN WG2 #100; R2-1713628; Reno, USA, Nov. 27-Dec. 1, 2017, pp. 1-3.
"3rd Generation Partnership Project; Technical Specification Group Radio Access Network; NR; Physical layer procedures for control (Release 15)", 3GPP TS 38213 V15.0.0, Dec. 2017, pp. 1-56.

* cited by examiner

FLEXIBLE SELECTION OF TIMING ADVANCE CONTROL METHOD FOR SUPPLEMENTARY UPLINK CONNECTIONS

TECHNICAL FIELD

The present invention generally relates to wireless communication networks, and particularly relates to adjusting transmission timing of wireless communication devices operating in such networks.

BACKGROUND

Available radio frequency (RF) spectrum is a scarce resource, where the trend is to assign cellular spectrum at higher frequencies. For development of $3^{rd}$ Generation Partnership Project (3GPP) "New Radio" (NR) standards, two main frequency bands are currently discussed: 450 MHz to 6 GHz (referred to herein as f2) and 24.25 to 52.6 GHz. Although this higher range is referred to herein as f3, it should be understood that f3 could also refer to a range at the higher end of f2.

Overcoming path loss is already a challenge for the higher ranges within f2, and it is expected to be an even greater problem at the higher frequencies of f3. Path loss is a particular challenge for the uplink (UL) from user equipment (UE) to base station (also referred to as "gNB"). This is mainly due to the limited capacity of the UE's battery, which limits the UE UL transmit power as compared to a base station DL transmit power. This problem is exacerbated for f3 frequencies, since neither the UE UL transmit power nor the base station receive structures (e.g., antenna arrays) can be improved enough to compensate for the additional path loss at these higher frequencies.

One way to overcome this limitation, as proposed in 3GPP for NR, is Supplementary Uplink (SUL). This is illustrated in FIG. 1, which shows an NR standalone scenario (NR SA) in which the UE does not utilize 4G Long-Term Evolution (LTE). In this scenario, the UE operates a bidirectional UL-DL at a higher f3 frequency, but in consideration of the weak f3 UL, a NR SUL (102) at the lower f2 frequency (in the shown example) is used to offload UE UL data and/or control traffic such that the f3 UL can carry higher-level control and other data traffic as needed.

An exemplary deployment scenario is shown in FIG. 2, where f2 and f3 bands are provided by different—but generally co-located—base stations having antenna reference points (ARPs) generally within the same area, such that the f2 and f3 radio channels to UEs are substantially similar in distance, but not necessarily identical. In some embodiments, the service provided in the f2 can utilize a legacy air interface (e.g., LTE) with an NR SUL sharing the f2 UL resources. This sharing can be accomplished by frequency division multiplexing (FDM) or time division multiplexing (TDM). In the example shown in FIG. 1, FDM sharing is employed.

When utilizing NR SUL on f2, a UE cannot be expected to receive the f2 DL, since that is not strictly needed for SUL operation. As generally known in the field, LTE and NR radio interfaces are based on orthogonal frequency division multiplexing (OFDM) and orthogonal frequency division multiple access (OFDMA) principles. As such, LTE and NR receivers often utilize Fast Fourier Transform (FFT) techniques to receive and demodulate the signal transmitted by the UE (UL) or the base station (DL). In the case of FDM sharing, illustrated in FIG. 1, the base station may utilize a common receiver path (e.g., single FFT) or separate receiver paths (e.g., different FFTs) for LTE UL and the NR SUL. When using separate receiver paths for SUL and LTE, there are normally no strict timing alignment requirements (e.g., no maximum time alignment error (TAE)) between the f2 and f3 base stations.

In the case of FDM sharing between the f2 NR SUL and LTE UL together with a common f2 receiver path (e.g., single FFT), the NR SUL and LTE UL must be time-aligned within the cyclic prefix (CP) of an OFDM symbol that is jointly demodulated using the single FFT. The use of a common FFT also requires that the sub-carrier spacing (SCS) between adjacent OFDM subcarriers used by NR SUL and LTE UL must be identical. For example, both should utilize 15-kHz SCS with a 7.5 kHz shift as in LTE. The identical SCS is also required for time-division multiplexed (TDM) f2 UL sharing schemes that do not utilize time-domain guard periods to separate the LTE UL and NR SUL, as discussed in more detail below.

FIG. 3 shows an exemplary TDM sharing scheme between NR SUL and LTE UL. Rather than a common FFT, as in the FDM scheme, TDM time alignment is required to prevent time-domain Inter Symbol Interference (ISI) between adjust OFDM symbols. The duration of the CP is normally sufficient to include both channel delay spread and UE UL errors including timing advance (TA) resolution, TA setting accuracy, DL signal tracking errors, etc. As shown in FIG. 3, a design without guard periods (GP) between symbols implies a requirement that the NR SUL and LTE UL must use identical CP durations and identical SCS.

FIG. 4 illustrates an alternate TDM sharing scheme that utilizes GPs between NR SUL and LTE UL OFDM symbols. The use of GPs creates isolation and accommodates larger UL timing errors—both for the NR SUL and LTE UL. Furthermore, GPs facilitate the use of different SCS for NR SUL and LTE UL. For example, a smaller SCS can be used for the LTE UL than the NR SUL, such that the resulting longer LTE CP can be accommodated by the GP such that it does not interfere with the subsequent NR SUL symbol. The disadvantage is the overhead that comes with guard periods, which can be significant for a TDM sharing scheme with fast switching periodicity.

Timing Advance (TA) is conventionally used by base stations to correct the UL transmission timing of UEs based on measurements of the received timing at the base stations, taking into account delay of the actual RF path between the base station ARP and the UE. In conventional bi-directional (i.e., UL/DL) connections, the UE can also track the timing of the base station's DL transmission. The actual RF path depends on the particular physical environment, the carrier frequency of the signal (e.g., f2 or f3), and distance to the base station. The environment and distance change as the UE moves within the cell, so that conventionally TA corrections are sent to address the resulting changes in UE transmission timing. Within a base station, this is a closed loop system based on actual measured UL timings at the single base stations and delta corrections, whereby future UE transmissions are advanced or delayed with respect to the timing of previous UE transmissions as measured by the base station. The TA adjustment process can have errors due to multiple factors, but these are acceptable so long as their sum is less than the length of the CP, which can be expressed as:

$$CP > TA_{resolution\ error} + T_{UE\ UL\ error} + T_{e\ DS},$$

where $T_{UE\ UL\ error}$ can include a margin for UE UL timing errors including correctly applying TA command setting, tracking the DL, and applying correct UL transmission. This term generally can be derived/known from 3GPP specifications. $T_{e\_DS}$ is the delay spread for the RF channel and mainly depends of the physical environment. Typically, the majority of the CP budget is generally assigned for the delay spread to allow safe operation in various RF environments, $TA_{resolution\ error}$ is the uncertainty due to the resolution of the timing correction in the TA (known by the base station based on definition of TA command in relevant 3GPP specifications).

As can be seen from the above explanation, this TA correction process is conventionally applied to a single UL connection. In 3GPP Release-11, the concept of Timing Advance Group (TAG) was introduced. A TAG consists of one or more serving cells with the same uplink TA and same downlink timing reference cell. For the combined f3 UL f2 SUL connections proposed for NR, however, the same common timing references are not available. Rather, the method proposed in 3GPP today is to use a single TAG that is derived from either the f3 UL or the f2 SUL, while having the UE adapt its timing to the DL from the f3 base station. The UE then receives TA commands (from base station f3) that are based on its previously measured f2 or f3 UL timings relative to their ideal timings. The implicit assumption here is that the f2 and f3 base stations are co-located, such that the respective RF path differences to the UE are substantially similar in distance, but not necessarily identical. Under this assumption, the idea is for the UE to use the same TA command (with a single TAG value) to adjust both the f3 UL and f2 SUL timing by the same amount. The resolution of this TAG value should correspond to the largest SCS and, thus, shortest CP.

In such cases, corrections must be made to the UE1 and/or UE3 f2 UL timing to keep these respective signals aligned for common processing by the f2 receiver (e.g., FFT). In conventional, non-SUL operation, these corrections are commonly sent to the UE by the base station as timing advance (TA) commands. Since a UE utilizing f2 SUL is not expected to receive f2 DL, however, such UEs cannot receive TA commands directly from the f2 base station. Instead, information representing the f2 timing offset can be communicated from the f2 base station to the f3 base station (e.g., through an X2 or similar interface), and further on the f3 DL (e.g., via a control channel) to the UE. Since TA commands are only relative to the last UE transmission (e.g., advance or delay timing), they do not require any strict intra-base station maximum TAE. Therefore, in this case, the TAE between the base stations does not need to be within a fraction of the cyclic prefix (CP), but should fit within a TA dynamic window, which can be seen as a function of maximum cell size. Avoiding strict TAE is beneficial since it reduces and/or eliminates cost and complexity that would otherwise be required to keep the two base stations tightly synchronized.

Nevertheless, there are several problems with this proposed solution. The TA command is either on the f2 or f3 UL or potentially a compromise between the two. For this to be sufficiently accurate in for both the f2 SUL and f3 UL, it requires a very strict and small Timing Alignment Error (TAE) and drift between the f2 and f3 base stations. In many situations, this could be difficult to achieve in practice. For example, the f2 base station can be an already existing LTE base station and/or the f2 and f3 equipment could be from different vendors with incompatible approaches to sharing accurate synchronization source or exchanging accurate timing information. Moreover, within each base station, individual parts of the timing error budget may be significant and not easily controlled and/or managed, leaving few ways to bring the total (f2+f3) TAE within a strict limit.

Furthermore, even if the f2 and f3 base stations are co-located and sufficiently time-synchronized, the actual RF path distances from the respective ARPs to the UE may not be the same. This is due to the respective propagation characteristics of the f2 and f3 bands, which can differ significantly. For example, an f2 signal may penetrate a particular obstacle and thereby result in a relatively direct, line-of-sight (LOS) path to the UE, while the same object may block the f3 signal, resulting in a longer, reflected (non-LOS) path to the UE. This is illustrated in FIG. 5. The difference (or error) between the f2 SUL (e.g., LOS) path and the f3 UL (e.g., non-LOS) path is referred to herein as $T_{e\ \Delta Channel\ SUL\text{-}NR\ UL}$.

Accordingly, these two issues create additional terms for the timing error budget that must be kept below the CP length, as shown below:

$$CP > TA_{resolution\ error} + T_{UE\ UL\ error} + T_{e\_DS} + TAE + T_{e\ \Delta Channel\ SUL\text{-}NR\ UL}.$$

These additional TAE and path difference terms make it even more challenging to meet the overall timing error budget, particularly since TAE is not strictly limited absent direct synchronization between f2 and f3 base stations. This allowed UL error and relations between the f3 and f2 UL depend on a multitude of factors like FDM or TDM sharing, shared receiver processing (e.g., FFT), GP, CP length, and RF channel delay spread (both f2 and f3 individually, as well as their difference). Moreover, f2 and f3 base stations (or ARPs) might not always be co-located in all deployment scenarios. Given all of these issues, problems, and/or factors, the currently proposed approach of a single TA command with a single TAG is not always feasible, desirable, and/or practical.

SUMMARY

Exemplary embodiments of the present disclosure can provide specific improvements to existing wireless communication systems, including helping to overcome various problems discussed above. These exemplary embodiments can determine, in a flexible case-by-case analysis, whether a common TAG can be used or if multiple TAGs are needed based on several conditions. This flexible determination allows tradeoffs between guard periods or multiple TAGs in a TDM scheme or between common receiver path versus single TAG in a FDM scheme. In one example, a closed-loop dedicated SUL TA approach could help to remove the described additional errors. A closed loop in this context means the f2 base station regularly measures the timing of the actual received SUL, communicates proper relative adjustments to the f3 base station, which sends this as dedicated f2 SUL TA commands to the UE over the f3 DL (using a separate SUL TAG). The timing corrections (advance or delay of the timing) are relative to the UE's previous transmission (measured by the f2 base station) and does not require any strict TAE between the base station, and the requirements on the $T_{e\ \Delta Channel\ SUL\text{-}NR\ UL}$ can be removed. When a single TAG and TA command can be used, additional embodiments can provide use of the command in an optimal way for optimal UL tunings.

The flexible approach of selecting multiple TAGs with closed loop TA on an as-needed basis can allow support for implementations that cannot meet strict TAE between f2 and f3 base stations; strict TAE is well known to add cost for products and installations. The approach can also allow for tradeoffs between multiple TAGs and the potential need for a guard period in a SUL TDM sharing scheme, where such a guard period would impact spectrum efficiency, especially for flexible and frequent uplink switching. The approach can further provide flexibility to decide whether to use a common RF chain and fast Fourier transform for the f2 base station UL receiver (this could also be a firm restriction in some existing base stations).

Various exemplary embodiments can reduce effects of the $T_{e\ \Delta Channel\ SUL\text{-}NR\ UL}$ error (environment and frequency dependent) that otherwise could contribute to additional spread and errors within the SUL UL between different SUL UEs and might not fit into a timing budget for certain implementations. Even if the f2 and f3 Antenna Reference Points (ARPs) may be co-located, the embodiments can be extended to allow for a physical separation of the f2 and f3 ARPs (i.e., not necessarily co-located).

According to some embodiments, a method of adjusting the transmission timing of a wireless communication device operating in a wireless communication network comprising first and second base stations can include determining a first allowable timing adjustment range corresponding to a first UL connection between the wireless communication device and the first base station, where the first UL connection is associated with a first DL connection between the wireless communication device and the first base station. The method can include determining a second allowable timing adjustment range corresponding to a SUL connection between the wireless communication device and the second base station, where the SUL connection is not associated with a DL connection between the wireless communication device and the second base station. The method can further include determining if a single TA value can be used to adjust the wireless communication device's transmission timing to satisfy both the first allowable timing adjustment range and the second allowable timing adjustment range. The method can also include performing a corrective action if it is determined that said single TA value cannot be used.

According to some embodiments, a method of operating a first base station in a wireless communication network that also includes a second base station can include determining a first TA value usable to adjust a wireless communication device's transmission timing for an UL connection with the first base station, wherein the UL connection is associated with a DL connection between the wireless communication device and the first base station. The method can also include receiving, from the second base station, a second TA value usable to adjust the wireless communication device's transmission timing for a SUL connection with the second base station, where the SUL connection is not associated with a DL connection between the wireless communication device and the second base station. The method can further include transmitting the first TA value and the second TA value to the wireless communication device via the DL connection.

According to some embodiments, a method of operating a wireless communication device in communication with first and second base stations in a wireless communication network can include performing one or more transmissions on an UL connection with the first base station, where the UL connection is associated with a DL connection between the wireless communication device and the first base station. The method can include performing one or more transmissions on a SUL connection with the second base station, where the SUL connection is not associated with a DL connection between the wireless communication device and the second base station. The method can include receiving, via the DL connection with the first base station, at least one TA value usable to adjust the wireless communication device's transmission timing for the UL connection and the SUL connection.

According to some embodiments, a method of operating a second base station in a wireless communication network that also includes a first base station can include receiving one or more transmissions on a SUL connection with a wireless communication device, where the SUL connection is supplementary to an UL connection between the first base station and the wireless communication device and not associated with a DL connection with the wireless communication device. The method can include determining a second TA value usable to adjust the wireless communication device's transmission timing on the SUL connection and transmitting, to the first base station, the second TA value. The method can further include receiving, from the first base station, a message configuring the second base station to perform at least one corrective action with respect to the SUL connection.

Further aspects of the present invention are directed to an apparatus, a base station, a wireless communication device, computer program products, or computer readable storage medium corresponding to the methods summarized above and functional implementations of the above-summarized base stations and wireless communication devices.

Of course, the present invention is not limited to the above features and advantages. Those of ordinary skill in the art will recognize additional features and advantages upon reading the following detailed description, and upon viewing the accompanying drawings.

DETAILED DESCRIPTION

Although not always desirable, certain measures can be made available to address various problems with the single TA command/TAG value discussed above. In an FDM UL sharing scheme, for example, by not allowing a shared receive processing (e.g., FFT) and using independent timing between the UL and SUL in the f2 base station, the strict timing error budget limit imposed by the f2 CP length could be removed. At a minimum, however, this reduces the flexibility of the f2 base station and, in some cases, may not even be possible for an already-installed f2 base station with existing restrictions. In a TDM UL sharing scheme, a time-domain GP between f2 UL and SUL could be introduced but, as noted above, this may not be always be desirable since it increases overhead and reduces spectrum usage efficiency.

Exemplary embodiments disclosed herein address these problems, issues, and/or drawbacks of existing solutions by providing a method comprising a flexible, case-by-case analysis, based on existing f2 and f3 conditions, to determine whether a single common TAG can be used for f2 and f3 timing alignment of a user equipment, or if multiple TAGs are needed instead. This flexible approach facilitates beneficial tradeoffs between GPs or multiple TAGs in a TDM f2 sharing scheme, or between multiple receiver paths and multiple TAG in a FDM f2 sharing scheme. Moreover, when it is determined that a single TAG and TA command is possible, feasible, and/or desirable, the exemplary methods and/or procedures can determine and/or select a single TAG value to facilitate optimal and/or sufficient timing adjustment for both f2 SUL and f3 UL.

Given a determination to use a single or dual TAG value(s), exemplary embodiments of the present disclosure also include a closed-loop method for tracking f2 SUL and f3 UL timing, that eliminates and/or mitigates the need for a strict TAE between the f2 and f3 base stations during normal operation. The UE can initiate a SUL by a transmitting random access to the f2 base station. The initial timing of the random-access preamble transmitted by the UE must be within the defined window of the f2 base station's random access receive window. Once the UL preamble is received, the initial timing of the SUL is known, and since the UE's preamble transmission timing is based on the f3 DL timing, a sufficiently accurate initial estimate of TAE+$T_{e\ \Delta Channel\ SUL\text{-}NR\ UL}$ at the time of the initial access will also exist.

Figure 1:
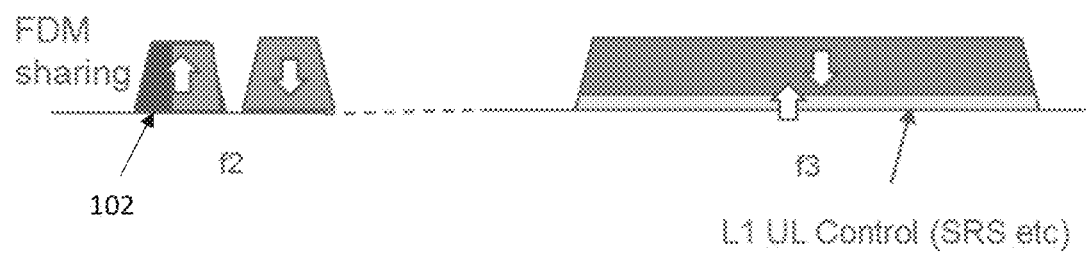
FIG. 1 illustrates Supplementary Uplink (SUL) in an NR standalone scenario (NR SA).
Figure 2:
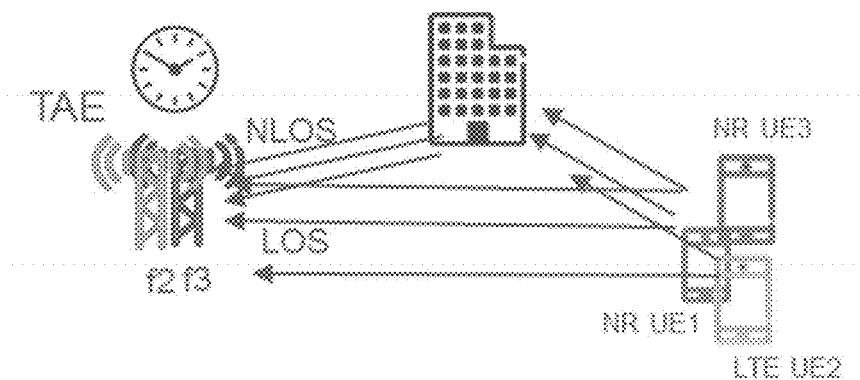
FIG. 2 illustrates an example of a typical NR SUL deployment scenario.
Figure 3:
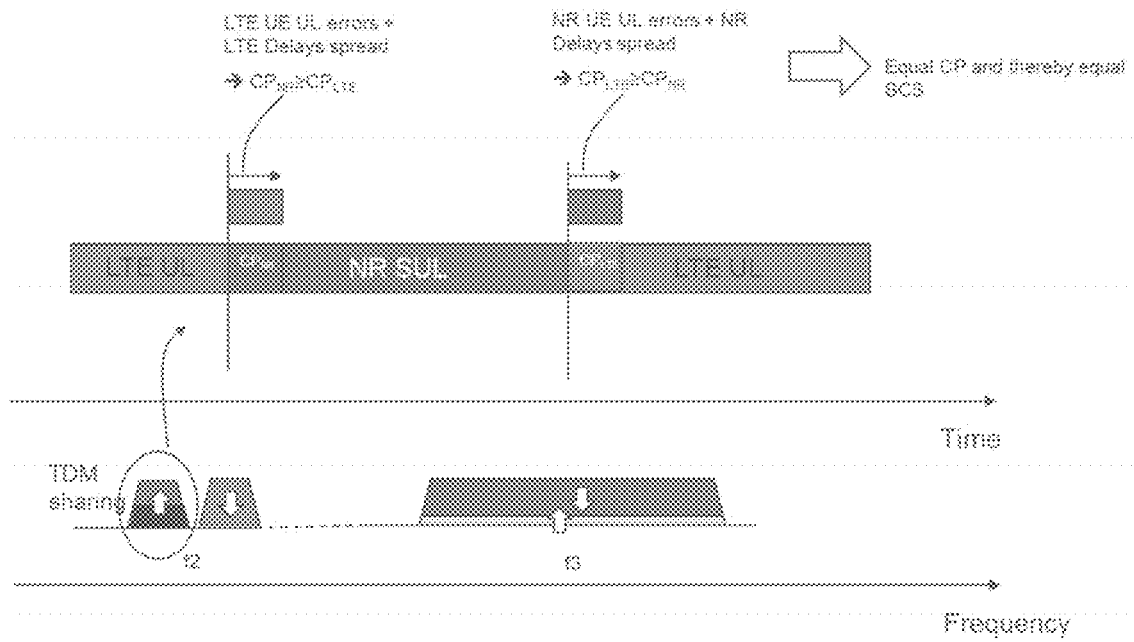
FIG. 3 illustrates NR SUL TDM sharing in f2 UL.
Figure 4:
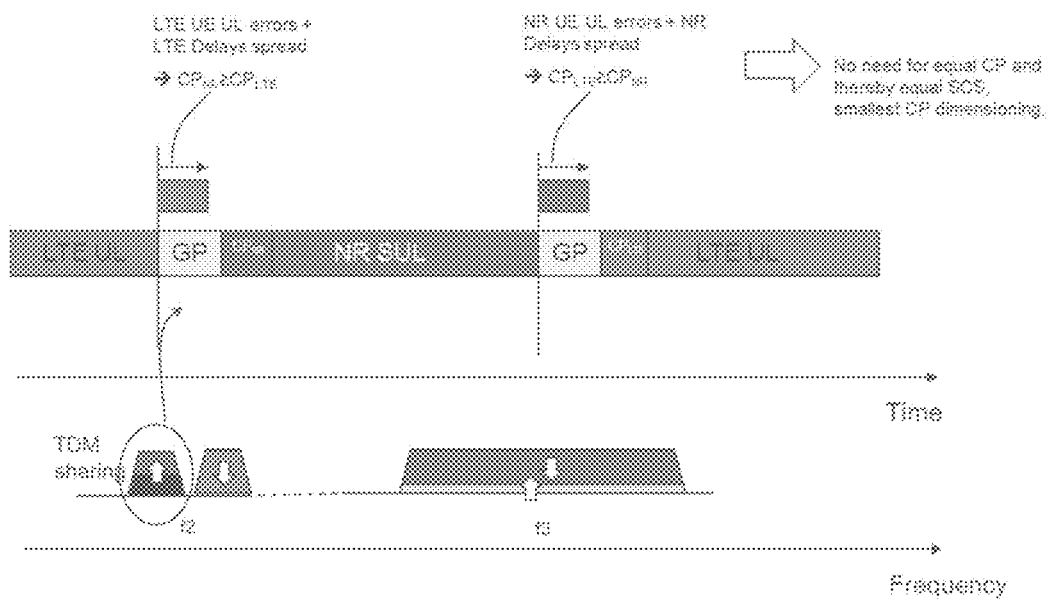
FIG. 4 illustrates a TDM scheme with inserted GP.
Figure 5:
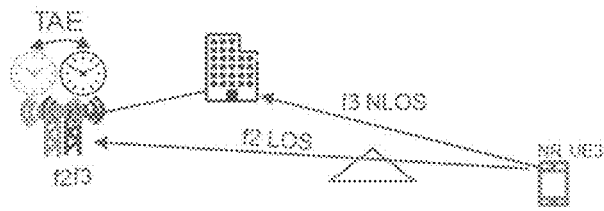
FIG. 5 illustrates TAE and a common TA problem.
Figure 6:
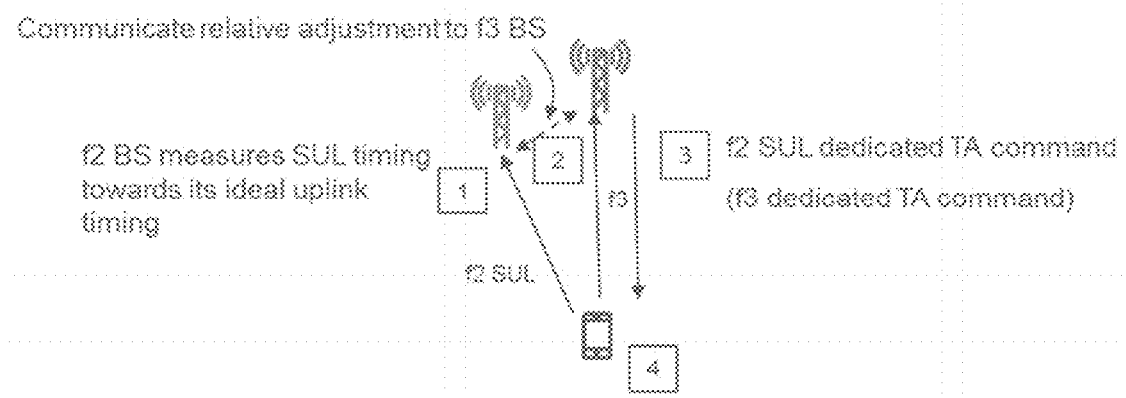
FIG. 6 illustrates a SUL closed-loop TA approach, according to some embodiments.

An exemplary embodiment of the closed-loop method is illustrated in FIG. 6. Regular uplink timing measurements can be performed by the f2 base station (operation 1) and relative adjustments (e.g., advance/delay with amount) based on these measurements can be communicated to the f3 base station (operation 2), e.g., via an X2 or similar interface. If it has been determined to use a dual-TAG approach for timing adjustment, the f3 base station communicates these received f2 SUL timing adjustments, along with its own determined timing adjustments to the f3 UL to the UE through one or more TA commands on the f3 DL (operation 3). If it has been determined to use a single TAG approach, the f2 base station instead communicates a selected single TAG value via a TA command on the f3 DL. The UE can then apply the one or more received TAG values to the respective f2 SUL and f3 UL.

In this manner, if the time drift between regular TA commands is limited, the UE can track the f3 DL and keep UL timing close to ideal for f2 UL timing. The required update rate of TA commands, given by the parameter Time Alignment Timer (TAT), can be configured between 0.5 seconds and infinity. This rate depends on the environment and on the base station clock solutions, including the frequency drift between the base stations and how fast the UE moves. Depending on the speed of the UE and the accuracy of the base station clocks, the update rate typically can be on the order of 1-10 sec. In such case, the drift of the base station clocks between updates will be very small.

$T_{UE\ UL\ error}$ can include a margin for UE UL timing errors including correctly applying TA command setting, tracking the DL, and applying correct UL transmission. This term generally can be derived/known from 3GPP specifications. $T_{e\ DS}$ is the delay spread for the RF channel and mainly depends of the physical environment. Typically, the majority of the CP budget is generally assigned for the delay spread to allow safe operation in various RF environments.

As mentioned earlier, in NR the TA command (e.g., TAG value) resolution error $TA_{resolution\ error}$ and UE uplink error $T_{UE\ UL\ error}$ depend on SCS, since the SCS has an inverse time-domain relationship with the CP (e.g., larger SCS, smaller CP). In NR, since the TA command resolution increases to match the smaller CP as SCS increases, $T_{UE\ UL\ error}$ decreases accordingly. For the closed loop approach with a dedicated f2 SUL TA commands, the resolution can be adapted to the $SCS_{f2\ SUL}$ actually used for the SUL. Likewise, the UE's ability to accurately track the f3 DL timing (e.g., between TA commands) improves for a higher $SCS_{f3}$; hence it can be beneficial if $SCS_{f3} > SCS_{f2\ SUL}$.

Figure 7:
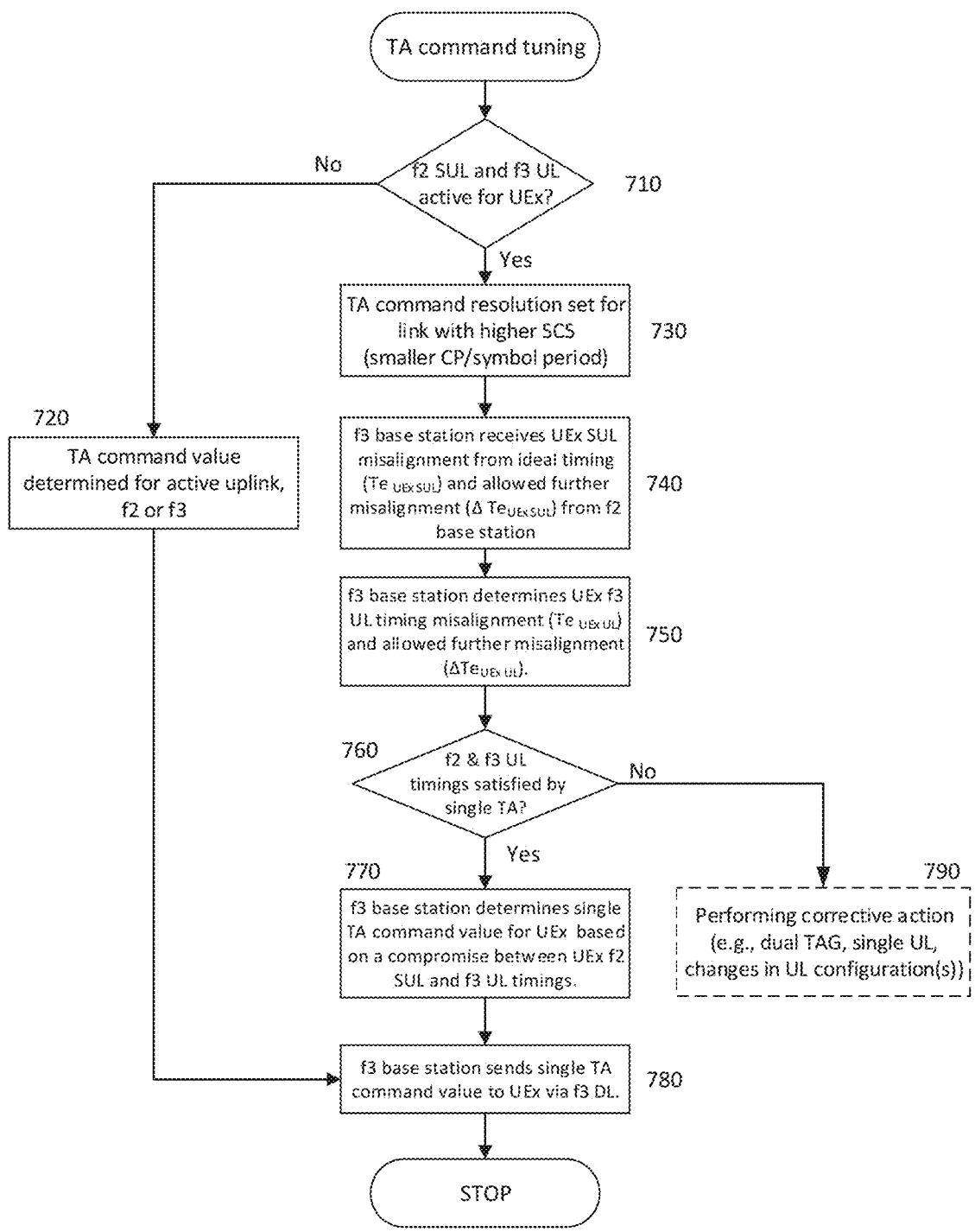
FIG. 7 illustrates TA Command tuning, according to some embodiments.

In the currently-agreed 3GPP approach, a "single" TA command adapts its resolution to the larger of the SCS, e.g., $\max(SCS_{f3\ SUL}, SCS_{f2\ SUL})$. In its basic form, the TA command value is purely based on the f3 UL timing, i.e. the UL is only optimized towards the measured f3 UL. As such, the f2 UL timing budget also needs to fit TAE+$T_{e\ \Delta Channel\ SUL\text{-}NR\ UL}$ as described earlier. Embodiments of the present disclosure improve upon this approach by basing the value used for a single TA command (when selected instead of dual f2/f3 values) on a compromise between both the f2 and f3 uplink timings for a specific UE. An exemplary method and/or procedure according to these embodiments is shown in FIG. 7. Although the method is illustrated by blocks in the particular order of FIG. 7, this order is merely exemplary such that the steps of the method may be performed in a different order than shown by FIG. 7, and may be combined and/or divided into blocks having different functionality. Furthermore, the exemplary method and/or procedure shown in FIG. 7 is complementary to, and can be used in conjunction with, the exemplary methods and/or procedures shown in FIGS. 10-12 to provide improvements and/or solutions to exemplary problems described herein.

Although the exemplary method and/or procedure is described in terms of being performed by the f3 base station, this is merely for purposes of simplifying the following explanation. The operations comprising the blocks of FIG. 7 can be performed by another network node (e.g., f2 base station or a centralized controller), or be collectively performed by multiple network nodes (e.g., certain operations by f2, certain other operations by f3, etc.).

In block 710, f3 base station determines for a particular UE (referred to as UEx), whether both f2 SUL and f3 UL are active. If it is determined in block 710 that both are not active, then operational flow proceeds to block 720, where the f3 base station determines a TA command value corresponding to an UL that is active. In such case, the f3 base station can set the resolution of the single TA command value according to the SCS of the active UL. On the other hand, if in block 710 it is determined that both are active, then operational flow proceeds to block 730, where the f3 base station determines a TA command resolution according to the higher SCS, e.g., max($SCS_{f3\ UL}$, $SCS_{f2\ SUL}$), or equivalently, the smaller CP duration.

In block 740, the f3 base station receives timing misalignment information corresponding to UEx's NR SUL from the f2 base station. In some embodiments, the f2 base station can provide parameters representing an allowable timing adjustment range (or window) for UEx's NR SUL, based on UEx's current NR SUL timing. These parameters can include, e.g., a current timing misalignment (represented by $Te_{UEx\ SUL}$) and an allowed further timing misalignment (represented by $\Delta Te_{UEx\ SUL}$). In other exemplary embodiments, the f2 base station can provide the f2 uplink error budget in a different format, and/or parameters usable to determine an allowable timing adjustment range including one or more of: SCS, GP, common/separate receive FFT, estimates of TAE and $T_{e\ \Delta Channel\ SUL\text{-}NR\ UL}$ and measured f2 uplink timing.

In block 750, the f3 base station determines the allowable timing adjustment range (or window) for UEx's f3 UL, based on UEx's current f3 UL timing. The allowable timing adjustment range can be determined from, or represented by, parameters such as a current timing misalignment (represented by $Te_{UEx\ UL}$) and an allowed further timing misalignment (represented by $\Delta Te_{UEx\ UL}$). For example, the f3 base station can determine an allowable timing adjustment range based on one or more of: SCS, GP, common/separate receive FFT, estimates of TAE and $T_{e\ \Delta Channel\ SUL\ NR\ UL}$ and measured f3 uplink timing. Note that the allowable timing adjustment range determined in block 750 can be the same as, or different from, the allowable timing adjustment range determined in block 740.

Figure 8:
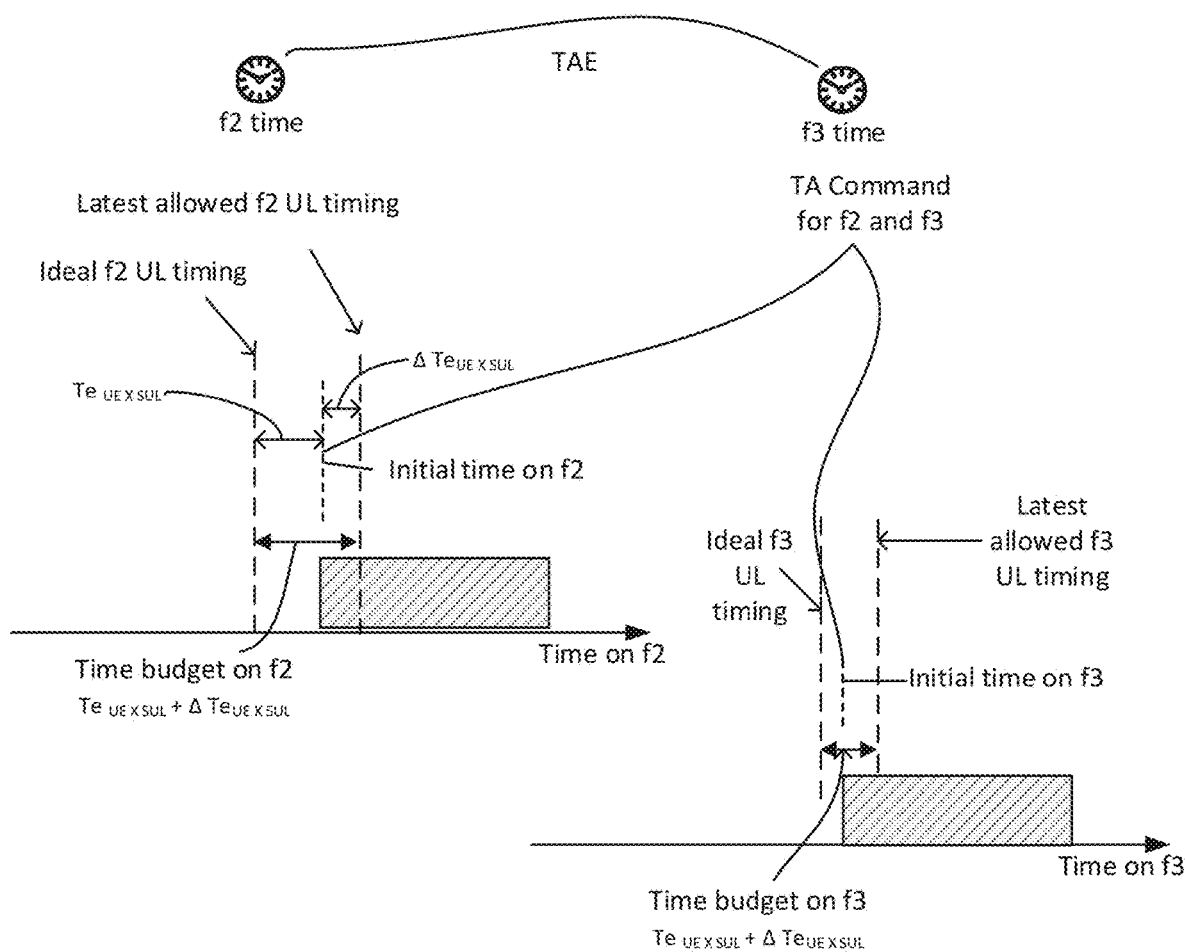
FIG. 8 illustrates exemplary f2 and f3 allowable timing adjustment ranges such that a single TA command value can be used, according to some embodiments.

In block 760, the f3 base station determines whether a single TA command value can be used to adjust the UEx's transmission timing to satisfy both the f3 UL allowable timing adjustment range (determined in block 750) and the f2 SUL allowable timing adjustment range (received/determined in block 740). For example, the f3 base station can determine whether the receive timing of both UEx's ULs (f3 UL and f2 SUL) are within the respective timing budgets based on the respectively used CPs, as discussed above, so as to facilitate correct FFT demodulation by f2 and f3 base stations. FIG. 8 shows an example scenario where the f2 and f3 allowable timing adjustment ranges are such that a single TA command value can be used to adjust the UEx's respective transmission timing so as to fall within, or satisfy, both ranges or windows.

If a positive determination is made in block 760 (e.g., corresponding to the example of FIG. 8), the operation proceeds to block 770 where the f3 base station determines and/or selects a particular single TA command value, taking into account the respective allowable timing adjustment ranges for both ULs, as well as other factors as needed. For example, there may be a range of TA command values that satisfy both allowable ranges, but the f3 base station can select a particular value with that range based on other factors including respective margins for both ULs, delay spreads of both ULs, direction and/or magnitude of TAE drift, and/or priority of one UL over the other UL. For example, a TA command value could be selected for equal margin, i.e., e $\Delta Te_{UEx\ UL} = \Delta Te_{UEx\ SUL}$. Alternately, if one of the ULs has a larger delay spread, a TA command value could be selected to provide equal margins taking into account the respective delay spreads. Likewise, if the TAE is drifting in a particular direction and rate, a TA command value could be selected such that equal margins will occur after a period of time according to the drift.

Figure 9:
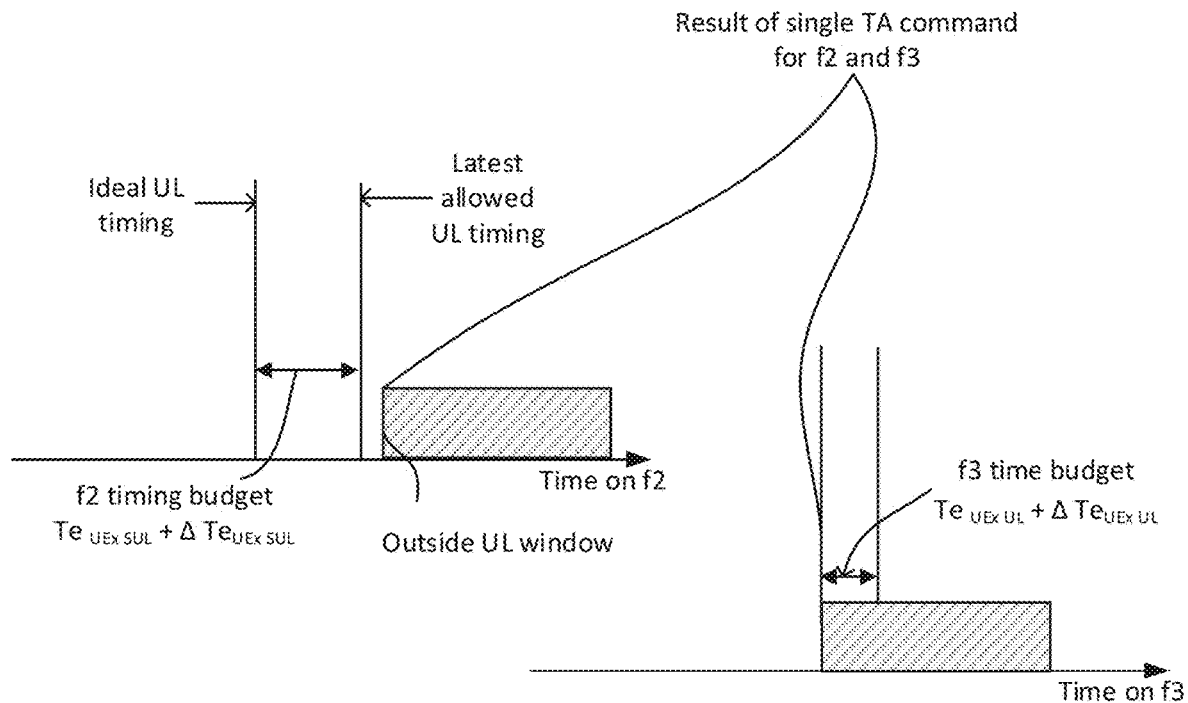
FIG. 9 illustrates exemplary f2 and f3 allowable timing adjustment ranges such that a single TA command value cannot be used, according to some embodiments.

In block 780, the f3 base station sends the single TA value determined in block 770 or block 720 to UEx via the f3 DL. On the other hand, if it is determined in block 760 that a single TA command value for adjusting the UEx's transmission timing cannot satisfy both allowable timing adjustment ranges, then operation proceeds to block 790, where a corrective action is performed. FIG. 9 shows an example scenario where the f2 and f3 allowable timing adjustment ranges are such that a single TA command value cannot be used to adjust the UEx's respective transmission timing so as to fall within, or satisfy, both ranges or windows, resulting in performance of a corrective action in block 790. Various corrective actions are possible including, e.g.: selecting individual TAGs that satisfy the respective allowable timing adjustment ranges; reverting to a single UL, such as by disabling the f2 SUL; and changing the configuration(s) of one or more of the f3 UL and the f2 SUL. Exemplary UL/SUL configuration changes can include one or more of adding/increasing GP, dual/non-shared receive FFT processing, changing SCS, etc.

Figure 10:
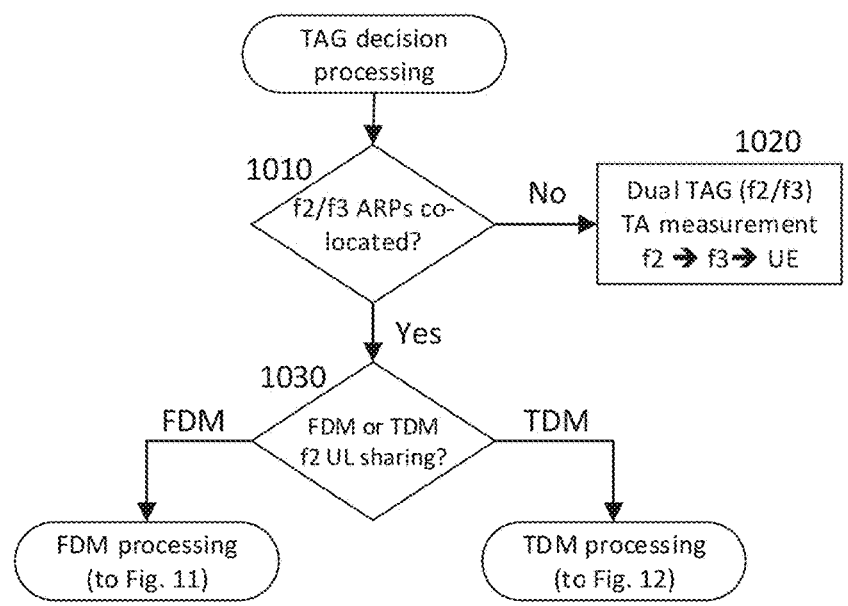
FIGS. 10-12 illustrate an exemplary method and/or procedure for performing a flexible, case-by-case determination, according to some embodiments.
Figure 11:
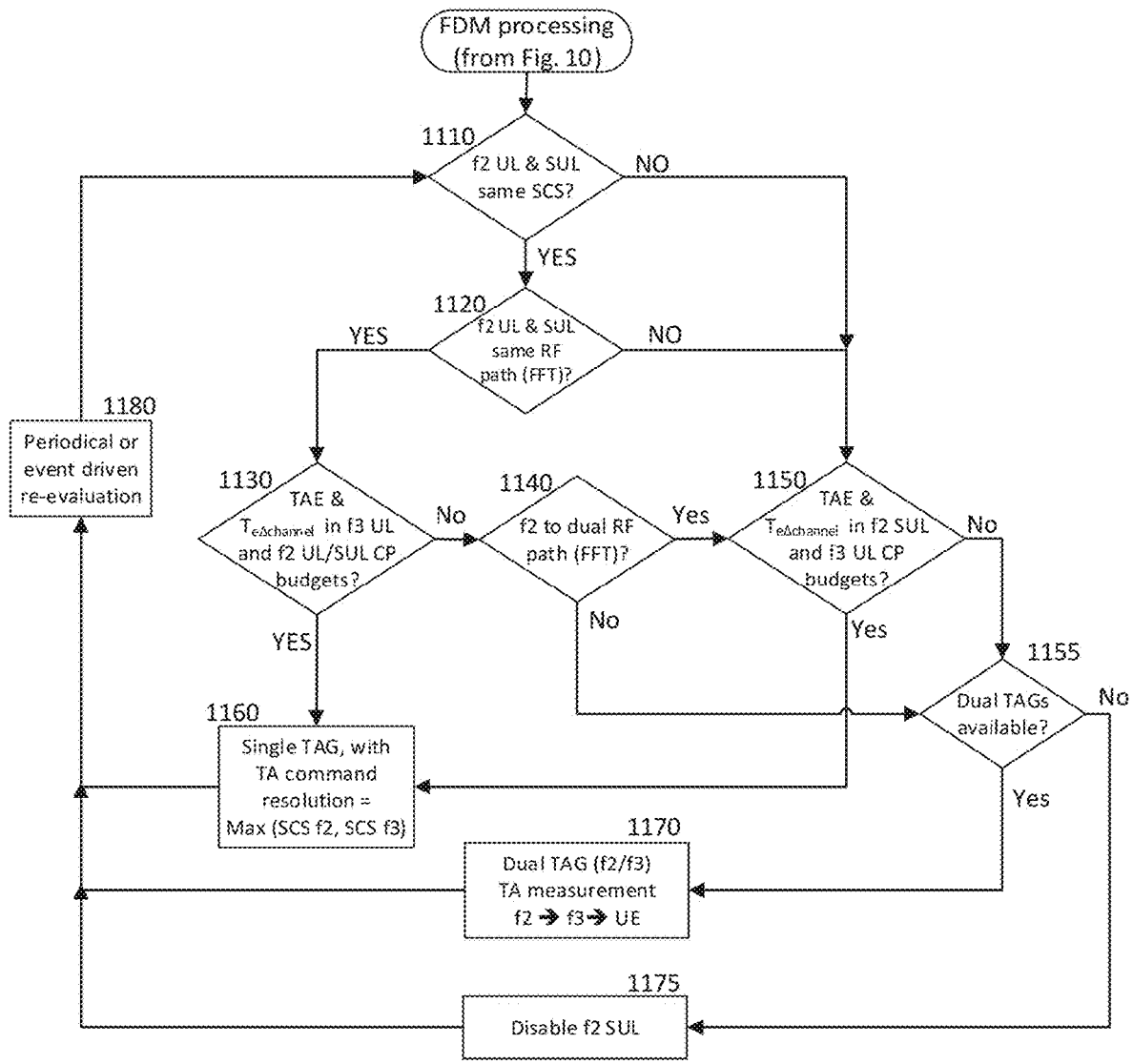
Figure 12:
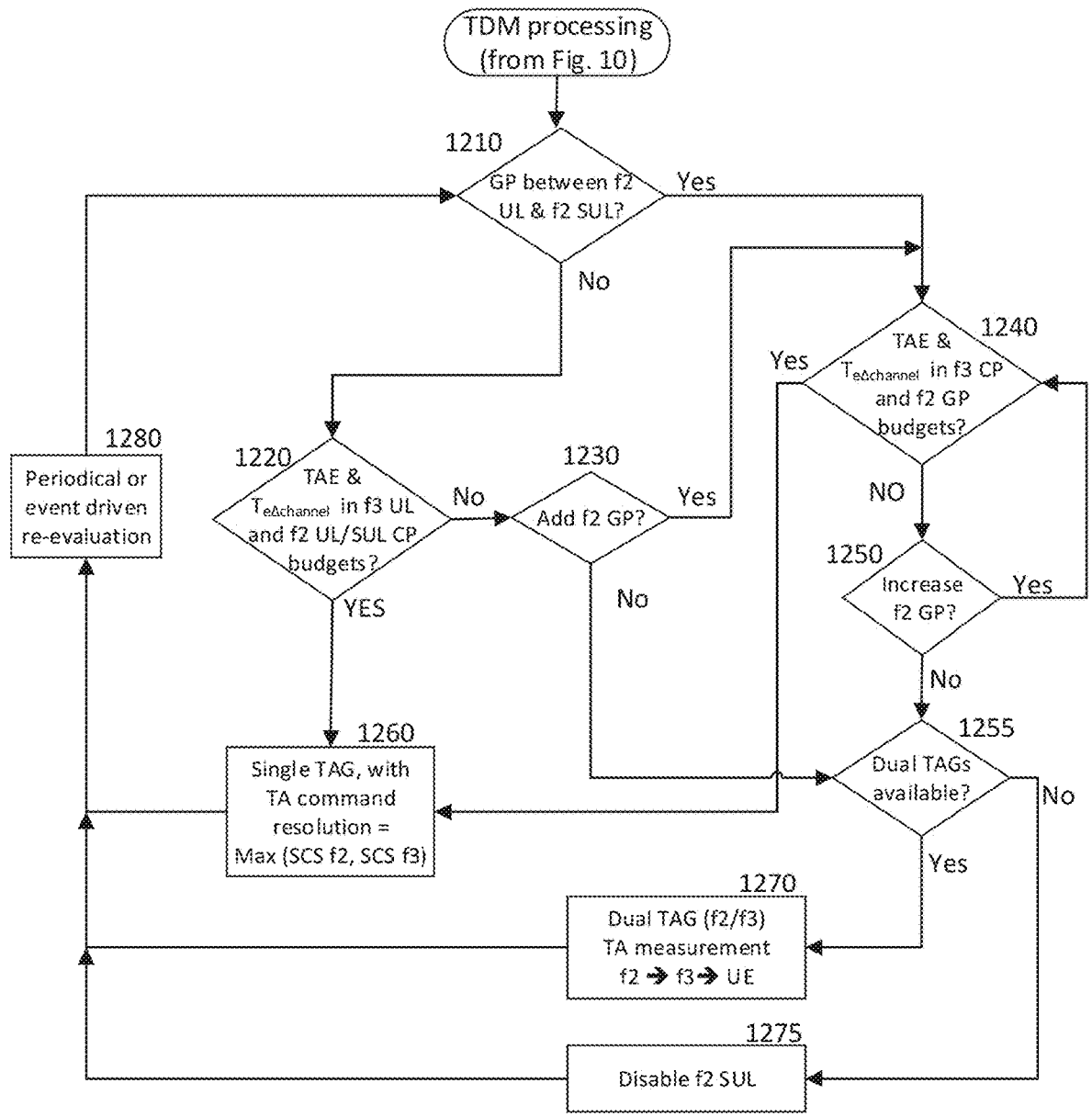

The exemplary method and/or procedure shown in FIG. 7 can be utilized individually or as part of a method and/or procedure for a flexible, case-by-case determination, based on existing f2 and f3 conditions, of whether a single common TAG can be used for f2 and f3 timing alignment of a user equipment, or if multiple TAGs are needed instead. This flexible approach facilitates tradeoffs between GPs or multiple TAGs in a TDM f2 sharing scheme, or between multiple receiver paths and multiple TAG in a FDM f2 sharing scheme. An exemplary method and/or procedure for performing the flexible, case-by-case determination is illustrated in FIGS. 10-12. More specifically, FIG. 10 shows the highest level of the method and/or procedure, while FIGS. 11-12 show the processing operations specific to FDM and TDM sharing, respectively.

Note that although the operations shown in FIGS. 10-12 may be described as being performed by a particular network node, such as the f3 base station, this is merely to simplify the explanation. The operations comprising FIGS. 10-12 can be performed by other single network nodes (e.g., f2 base station or a centralized controller), or be collectively performed by multiple network nodes (e.g., certain operations by f2, certain other operations by f3, certain other operations by a centralized controller).

Processing begins in block 1010, where it is determined whether the antenna reference points (ARPs) of the f2 and f3 base stations are co-located, at least to an extent sufficient to facilitate the use of single TA command/TAG value to adjust the timing of both an f2 SUL and an f3 UL for a particular UE. If it is determined that the ARPs are not sufficiently co-located, the operation proceeds to block 1020, where dual TA commands configured with different TAG values that satisfy both the f2 SUL and f3 UL allowable timing adjustment ranges are determined. On the other hand, if it is determined that the ARPs are sufficiently co-located, the operation proceeds to block 1030, where the type of f2 UL/SUL sharing is determined. In the case of FDM sharing, operation proceeds to the exemplary method and/or procedure shown in FIG. 10. In the case of TDM sharing, operation proceeds to the exemplary method and/or procedure shown in FIG. 11.

The exemplary method and/or procedure used for FDM processing, shown in FIG. 11, will now be described. Although the method is illustrated by blocks in the particular order shown in FIG. 11, this order is merely exemplary such that the steps of the method may be performed in a different order than shown by FIG. 11 and may be combined and/or divided into blocks having different functionality. Furthermore, the exemplary method and/or procedure shown in FIG. 11 can be used in conjunction with, the exemplary methods and/or procedures shown in FIGS. 7, 10, and/or 12 to provide improvements and/or solutions to exemplary problems described herein.

The exemplary method and/or procedure begins in block 1110, where it is determined whether the f2 UL and SUL utilize the same SCS. In case the exemplary method and/or procedure is being performed by a node other than the f2 base station (e.g., f3 base station), information about the SCS of f2 UL and f2 SUL can be provided to that particular node. If the determination in block 1110 is positive, operation can proceed to block 1120 where it is determined whether the f2 UL and SUL share the same receive path processing (e.g., FFT). In case the exemplary method and/or procedure is being performed by a node other than the f2 base station (e.g., f3 base station), information about the FFT sharing of f2 UL and f2 SUL can be provided to that particular node. In case the determination in block 1120 is positive, operation can proceed to block 1130. In the case that either of the determinations in blocks 1110 and 1120 are negative, operation proceeds to block 1150.

In block 1130, it is determined whether the current f2-f3 timing alignment error (TAE) and f2-f3 RF path difference to the UE ($T_{e\ \Delta Channel\ SUL\text{-}NR\ UL}$) are within the CP range for both f3 UL and f2 UL/SUL. Note that the requirement of alignment with f2 UL (e.g., an LTE UL) is due to f2 UL and SUL using a common FFT. In some exemplary embodiments, this can be done by determining allowable timing adjustment ranges for both f2 UL/SUL and f3 UL, e.g., based on respective current timing misalignments ($Te_{UEx\ SUL}$, $Te_{UEx\ UL}$) and respective allowed further timing misalignments ($\Delta Te_{UEx\ SUL}$, $\Delta Te_{UEx\ UL}$), in the manner described above with reference to the exemplary method and/or procedure of FIG. 7. This operation in block 1130 can also involve determining whether a single TA command value can be used to adjust the UEx's transmission timing to satisfy both determined allowable timing adjustment ranges, as also described above with reference to FIG. 7. In case the determination in block 1130 is positive, operation can proceed to block 1160 where a particular single TA command value is determined and/or selected, taking into account the respective allowable timing adjustment ranges for both ULs, as well as other factors as needed. The resolution of the single TA command value can be determined according to the higher SCS, e.g., $\max(SCS_{f3\ UL}, SCS_{f2\ SUL})$, or equivalently, the smaller CP duration.

On the other hand, in case the determination in block 1130 is negative, operation can proceed to block 1140, where it is determined whether to convert the f2 shared SUL/UL receive processing (e.g., FFT) to an arrangement with separate FFT processing for f2 SUL and f2 UL. This determination can be based on the feasibility, desirability, and/or necessity of such a conversion, which can be further based on information regarding the f2 base station's current UL load conditions, remaining UL/DL capacity, etc. This determination in block 1140 can also be based on the ability of an external entity (e.g., f3 base station) to effect a change on the internal receive processing of the f2 base station. In the case of existing deployments and/or equipment from multiple vendors, this capability may not be available to the f3 base station. Note that this conversion can correspond to one of the "corrective actions" performed according to block 790 of FIG. 7. If the determination in block 1140 is negative, operation can proceed to block 1155, described below.

On the other hand, if the determination in block 1140 is positive, the conversion of f2 to dual SUL/UL receive processing is made and operation proceeds to block 1150, where it is determined whether the current f2-f3 timing alignment error (TAE) and f2-f3 RF path difference to the UE ($T_{e\ \Delta Channel\ SUL\text{-}NR\ UL}$) are within the CP range of both f2 SUL and f3 UL. Note that unlike block 1130, the requirement of alignment with f2 UL (e.g., an LTE UL) is not present in block 1150 due to f2 UL and SUL using different FFTs. Otherwise, this operation can be substantially similar to the operation performed in block 1130, described above. If the determination in block 1150 is positive, operation can proceed to block 1160 (described above), in which a single TA command value and resolution is determined and/or selection.

On the other hand, if the determination in block 1150 is negative, operation can proceed to block 1155, where it is determined whether the ability to use dual individual f2/f3 TA command values (e.g., TAGs) is available. For example, such a feature may not be available due to vendor incompatibility, legacy equipment, etc. If the determination in block 1155 is negative, operation can proceed to block 1175, where the f2 SUL can be disabled. The operation in block 1175 can correspond to one of the "corrective actions" performed in block 790 of FIG. 7.

On the other hand, if the determination in block 1155 is positive, operational flow can proceed to block 1170, where dual individual TA command values (e.g., TAGs) that satisfy the respective allowable timing adjustment ranges are selected and/or determined. Note that this operation in block 1170 can correspond to one of the "corrective actions" performed according to block 790 of FIG. 7. Subsequently, the operations of blocks 1160, 1170, and 1175 can proceed to block 1180, where a re-evaluation of the flexible, case-by-case determination, based on existing f2 and f3 conditions, is initiated either periodically (e.g., upon expiration of a periodic timer) or upon occurrence of a particular event. Such events can include expiration of a non-periodic timer set based on estimate TAE drift and/or UE mobility (e.g., from detected Doppler shift of the RF signal), with margins derived from $\Delta Te_{UEx\ UL}$ and $\Delta Te_{UEx\ SUL}$.

The exemplary method and/or procedure used for TDM processing, shown in FIG. 12, will now be described. Although the method is illustrated by blocks in the particular order shown in FIG. 12, this order is merely exemplary such that the steps of the method may be performed in a different order than shown by FIG. 12 and may be combined and/or divided into blocks having different functionality. Furthermore, the exemplary method and/or procedure shown in FIG. 12 can be used in conjunction with, the exemplary methods and/or procedures shown in FIGS. 7, 10, and/or 11 to provide improvements and/or solutions to exemplary problems described herein.

The exemplary method and/or procedure begins in block 1210, where it is determined whether there is a GP between the f2 UL and SUL. In case the exemplary method and/or procedure is being performed by a node other than the f2 base station (e.g., f3 base station), information about the existence of a GP between f2 UL and SUL can be provided to that particular node. If the determination in block 1210 is negative, operation can proceed to block 1220 where it is determined whether the current f2-f3 timing alignment error (TAE) and f2-f3 RF path difference to the UE ($T_{e\ \Delta Channel\ SUL\text{-}NR\ UL}$) are within the CP range for both f3 UL and f2 UL/SUL. Note that the requirement of alignment with f2 UL (e.g., an LTE UL) is due to lack of GP between f2 UL and f2 SUL. In some exemplary embodiments, this can be done by determining allowable timing adjustment ranges for both f2 SUL and f3 UL, e.g., based on respective current timing misalignments ($Te_{UEx\ SUL}$, $Te_{UEx\ UL}$) and respective allowed further timing misalignments ($\Delta Te_{UEx\ SUL}$, $\Delta Te_{UEx\ UL}$), in the manner described above with reference to the exemplary method and/or procedure of FIG. 7.

This operation in block 1220 can also involve determining whether a single TA command value can be used to adjust the UEx's transmission timing to satisfy both determined allowable timing adjustment ranges, as also described above with reference to FIG. 7. In case the determination in block 1220 is positive, operation can proceed to block 1260 where a particular single TA command value is determined and/or selected, taking into account the respective allowable timing adjustment ranges for both ULs, as well as other factors as needed. The resolution of the single TA command value can be determined according to the higher SCS, e.g., max($SCS_{f3\ UL}$, $SCS_{f2\ SUL}$), or equivalently, the smaller CP duration.

On the other hand, in case the determination in block 1220 is negative, operation can proceed to block 1230, where it is determined whether to add a GP between f2 SUL and UL. This determination can be based on the feasibility, desirability, and/or necessity of adding a GP, which can be further based on information regarding the f2 base station's current UL load conditions, remaining UL/DL capacity, etc. This determination in block 1230 can also be based on the ability of an external entity (e.g., f3 base station) to effect a change on the internal receive processing of the f2 base station. In the case of existing deployments and/or equipment from multiple vendors, this capability may not be available to the f3 base station. Note that the GP addition can correspond to one of the "corrective actions" performed according to block 790 of FIG. 7. If the determination in block 1230 is negative, operation can proceed to block 1255, described below.

On the other hand, if the determination in block 1230 is positive, a GP is added between f2 SUL and UL, and operation proceeds to block 1240, where it is determined whether the current f2-f3 timing alignment error (TAE) and f2-f3 RF path difference to the UE ($T_{e\ \Delta Channel\ SUL\text{-}NR\ UL}$) are within f2 UL GP budget and the f3 UL CP budget. Note that the lack of requirement of alignment with f2 UL (e.g., an LTE UL) is due to inclusion of GP between f2 UL and f2 SUL. Otherwise, this operation can be substantially similar to the operation performed in block 1220, described above. If the determination in block 1240 is positive, operation can proceed to block 1260 (described above), in which a single TA command value and resolution is determined and/or selected.

On the other hand, if the determination in block 1240 is negative, operation can proceed to block 1250, where it is determined whether to increase the GP between f2 UL and SUL.

Note that the GP increase can correspond to one of the "corrective actions" performed according to block 790 of FIG. 7. This determination in block 1250 can be based on the same, or substantially similar, factors as the determination made in block 1230, described above. If the determination in block 1250 is positive, the GP between f2 SUL and UL is increased, and operation returns to block 1240 to determine whether the added GP is sufficient to satisfy the timing requirements. Once a sufficient GP is established, operation can proceed to block 1260, described above.

On the other hand, if the determination in block 1250 is negative, operational flow can proceed to block 1255, where it is determined whether the ability to use dual individual f2/f3 TA command values (e.g., TAGs) is available. For example, such a feature may not be available due to vendor incompatibility, legacy equipment, etc. If the determination in block 1255 is negative, operation can proceed to block 1275, where the f2 SUL can be disabled. Note that the operation in block 1275 can correspond to one of the "corrective actions" performed in block 790 of FIG. 7.

On the other hand, if the determination in block 1255 is positive, operational flow can proceed to block 1270, where dual individual TA command values (e.g., TAGs) that satisfy the respective allowable timing adjustment ranges are selected and/or determined. Note that this operation in block 1270 can correspond to one of the "corrective actions" performed according to block 790 of FIG. 7. Subsequently, the operations of blocks 1260, 1270, and 1275 can proceed to block 1280, where a re-evaluation of the flexible, case-by-case determination, based on existing f2 and f3 conditions, is initiated either periodically (e.g., upon expiration of a periodic timer) or upon occurrence of a particular event. Such events can include expiration of a non-periodic timer set based on estimate TAE drift and/or UE mobility (e.g., from detected Doppler shift of the RF signal), with margins derived from $\Delta Te_{UEx\ UL}$ and $\Delta Te_{UEx\ SUL}$.

The exemplary embodiments briefly discussed above facilitate support for designs and/or installations that cannot meet strict TAE requirements between f2 and f3 base stations, or implementations that could meet such requirements but in a manner that would be too costly or complex. Such embodiments can be particularly beneficial for existing f2 base stations that were not specifically designed, configured, and/or installed with TAE limitations and/or spectrum-sharing in mind.

For example, such embodiments can facilitate tradeoffs between multiple TAGs and GP in a TDM sharing scheme. As a further example, in FDM sharing schemes, such embodiments can provide flexibility to decide whether to use a common RF chain (e.g., FFT) and/or SCS, increase a CP, or to use multiple TAGs. In addition, such embodiments also facilitate the f2 and f3 ARPs to be physically separated rather than requiring strict co-location, thereby providing deployment flexibility and potential cost savings. Furthermore, such embodiments can reduce effects of $T_{e\ \Delta Channel\ SUL\text{-}NR\ UL}$ (environment and frequency-dependent channel delay difference), both for a particular UE and also the spread among various UEs sharing an f2 or f3 carrier, that otherwise might not fit the CP-driven timing error for certain implementations.

Figure 13:
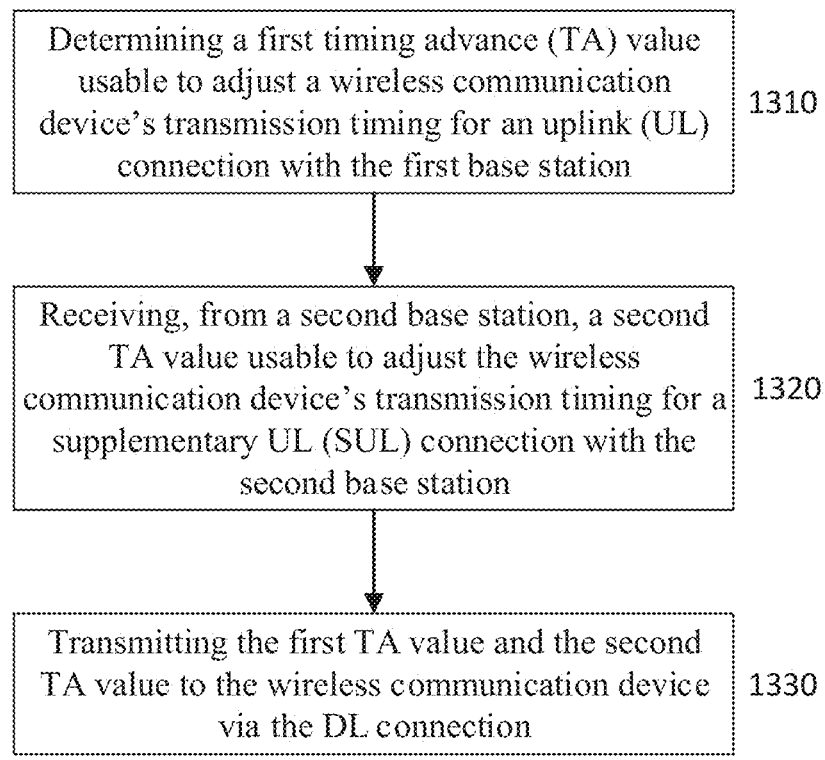
FIG. 13 illustrates a flow diagram of an exemplary method and/or procedure for use by a first network node, according to some embodiments.

FIG. 13 shows a flow diagram of an exemplary method and/or procedure for use by a first network node (e.g., base station, eNB, gNB, etc., or component thereof) for configuring uplink (UL) transmission timing of a wireless communication device (e.g., UE or component of a UE, such as a modem), according to one or more exemplary embodiments of the present disclosure. The exemplary method and/or procedure shown in FIG. 13 can be implemented, for example, in a network node configured according to FIG. 17 (described below). Furthermore, as explained below, the exemplary method and/or procedure shown in FIG. 13 can be utilized cooperatively with the exemplary method and/or procedures shown in FIGS. 7, 10-12, and/or 14-15 to provide various exemplary benefits described herein. In addition, although FIG. 13 shows blocks in a particular order, this order is merely exemplary, and the operations of the exemplary method and/or procedure can be performed in a different order than shown in FIG. 13 and can be combined and/or divided into blocks having different functionality.

The exemplary method and/or procedure shown in FIG. 13 can include determining a first TA value usable to adjust a wireless communication device's transmission timing for an UL connection with the first base station (block 1310), where the UL connection is associated with a DL connection between the wireless communication device and the first base station. The exemplary method and/or procedure can also include receiving, from the second base station, a second TA value usable to adjust the wireless communication device's transmission timing for a SUL connection with the second base station, wherein the SUL connection is not associated with a DL connection between the wireless communication device and the second base station (block 1320). The exemplary method and/or procedure can also include transmitting the first TA value and the second TA value to the wireless communication device via the DL connection (block 1333).

Figure 14:
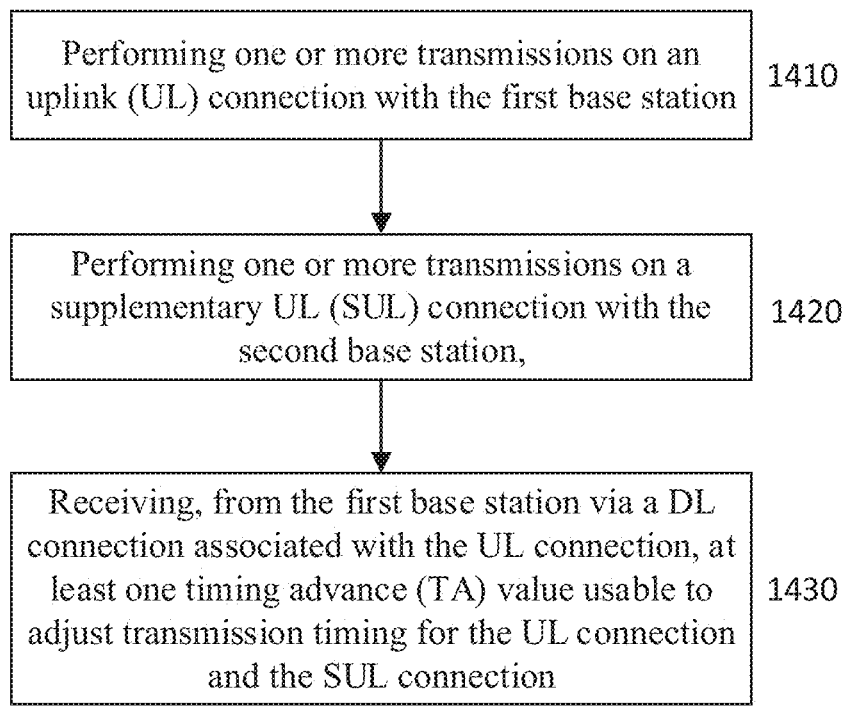
FIG. 14 illustrates a flow diagram of an exemplary method and/or procedure for use by a wireless communication device, according to some embodiments.

FIG. 14 shows a flow diagram of an exemplary method and/or procedure for use by a wireless communication device (e.g., UE or component of a UE, such as a modem) in communication with first and second network nodes (e.g., base stations, eNBs, gNBs, etc., or components thereof) in a wireless communication network, according to one or more exemplary embodiments of the present disclosure. The exemplary method and/or procedure shown in FIG. 14 can be implemented, for example, in a wireless communication device configured according to FIG. 16 (described below). Furthermore, as explained below, the exemplary method and/or procedure shown in FIG. 14 can be utilized cooperatively with the exemplary method and/or procedures shown in FIGS. 7, 10-13, and/or 15 to provide various exemplary benefits described herein. In addition, although FIG. 14 shows blocks in a particular order, this order is merely exemplary, and the operations of the exemplary method and/or procedure can be performed in a different order than shown in FIG. 14 and can be combined and/or divided into blocks having different functionality.

The exemplary method and/or procedure shown in FIG. 14 can include performing one or more transmissions on an UL connection with the first base station, where the UL connection is associated with a DL connection between the wireless communication device and the first base station (block 1410). The exemplary method and/or procedure can also include performing one or more transmissions on a SUL connection with the second base station, where the SUL connection is not associated with a DL connection between the wireless communication device and the second base station (block 1420). The exemplary method and/or procedure can further include receiving, via the DL connection with the first base station, at least one TA value usable to adjust the wireless communication device's transmission timing for the UL connection and the SUL connection (block 1430).

Figure 15:
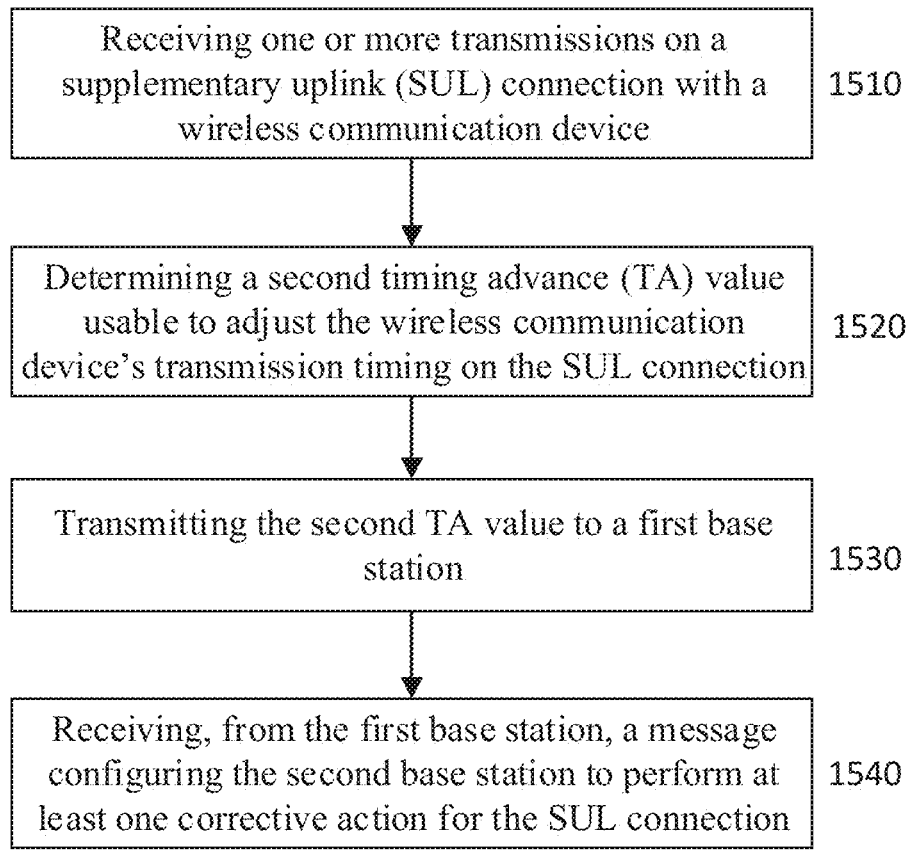
FIG. 15 illustrates a flow diagram of an exemplary method and/or procedure for use by a second network node, according to some embodiments.

FIG. 15 shows a flow diagram of an exemplary method and/or procedure for use by a second network node (e.g., base station, eNB, gNB, etc., or component thereof) in a wireless communication network that also includes a first network node (e.g., base station, eNB, gNB, etc., or component thereof), according to one or more exemplary embodiments of the present disclosure. The exemplary method and/or procedure shown in FIG. 13 can be implemented, for example, in a network node configured according to FIG. 17 (described below). Furthermore, as explained below, the exemplary method and/or procedure shown in FIG. 15 can be utilized cooperatively with the exemplary method and/or procedures shown in FIGS. 7 and/or 10-14 to provide various exemplary benefits described herein. In addition, although FIG. 15 shows blocks in a particular order, this order is merely exemplary, and the operations of the exemplary method and/or procedure can be performed in a different order than shown in FIG. 15 and can be combined and/or divided into blocks having different functionality.

The method shown in FIG. 15 can include receiving one or more transmissions on an SUL connection with a wireless communication device, where the SUL connection is supplementary to an UL connection between the first base station and the wireless communication device and not associated with a DL connection with the wireless communication device (block 1510). The method can include determining a second TA value usable to adjust the wireless communication device's transmission timing on the SUL connection (block 1520). The method can further include transmitting, to the first base station, the second TA value (block 1530), and receiving, from the first base station, a message configuring the second base station to perform at least one corrective action with respect to the SUL connection (block 1540).

Figure 16:
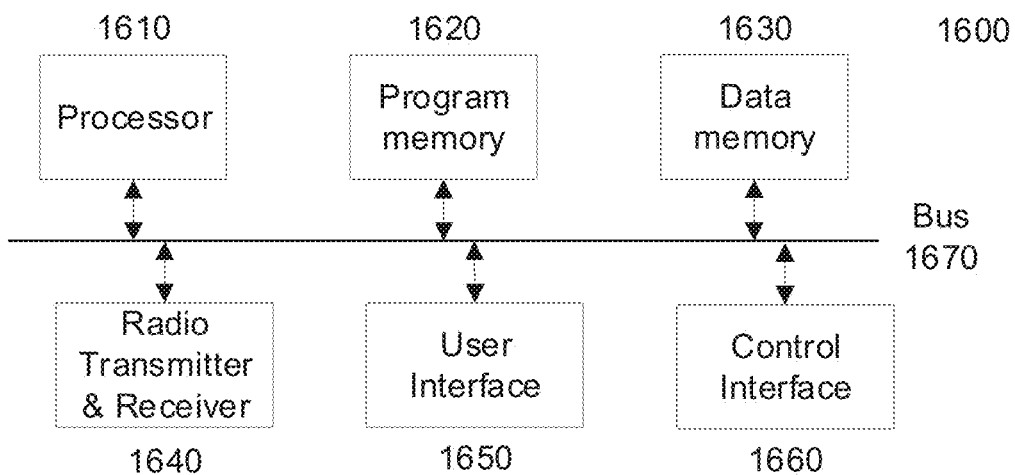
FIG. 16 illustrates a block diagram of an exemplary wireless device or UE configurable according to various exemplary embodiments.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc. FIG. 16 shows a block diagram of an exemplary wireless device or user equipment (UE) configurable according to various exemplary embodiments of the present disclosure, including execution of instructions on a computer-readable medium comprising one or more exemplary methods for configuring and/or utilizing a plurality of transmit and/or receive conversion systems according to one or more of the embodiments described herein above.

Exemplary device 1600 can comprise a processor 1610 that can be operably connected to a program memory 1620 and/or a data memory 1630 via a bus 1670 that can comprise parallel address and data buses, serial ports, or other methods and/or structures known to those of ordinary skill in the art. Program memory 1620 comprises software code or program executed by processor 1610 that facilitates, causes and/or programs exemplary device 1600 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.11 WiFi, HDMI, USB, Firewire, etc., or any other current or future protocols that can be utilized in conjunction with radio transceiver 1640, user interface 1650, and/or host interface 1660.

For example, processor 1610 can execute program code stored in program memory 1620 that corresponds to MAC, RLC, PDCP, and RRC layer protocols standardized by 3GPP (e.g., for NR and/or LTE). As a further example, processor 1610 can execute program code stored in program memory 1620 that, together with radio transceiver 1640, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1620 can also comprises software code executed by processor 1610 to control the functions of device 1600, including configuring and controlling various components such as radio transceiver 1640, user interface 1650, and/or host interface 1660. Program memory 1620 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1620 can comprise an external storage arrangement (not shown) remote from device 1600, from which the instructions can be downloaded into program memory 1620 located within or removably coupled to device 1600, so as to enable execution of such instructions.

Data memory 1630 can comprise memory area for processor 1610 to store variables used in protocols, configuration, control, and other functions of device 1600, including operations corresponding to, or comprising, any of the exemplary methods and/or procedures described herein. Moreover, program memory 1620 and/or data memory 1630 can comprise non-volatile memory (e.g., flash memory), volatile memory (e.g., static or dynamic RAM), or a combination thereof. Furthermore, data memory 1630 can comprise a memory slot by which removable memory cards in one or more formats (e.g., SD Card, Memory Stick, Compact Flash, etc.) can be inserted and removed. Persons of ordinary skill in the art will recognize that processor 1610 can comprise multiple individual processors (including, e.g., multi-core processors), each of which implements a portion of the functionality described above. In such cases, multiple individual processors can be commonly connected to program memory 1620 and data memory 1630 or individually connected to multiple individual program memories and or data memories. More generally, persons of ordinary skill in the art will recognize that various protocols and other functions of device 1600 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1640 can comprise radio-frequency transmitter and/or receiver functionality that facilitates the device 1600 to communicate with other equipment supporting like wireless communication standards and/or protocols. In some exemplary embodiments, the radio transceiver 1640 includes a transmitter and a receiver that enable device 1600 to communicate with various 5G/NR networks according to various protocols and/or methods proposed for standardization by 3GPP and/or other standards bodies. For example, such functionality can operate cooperatively with processor 1610 to implement a PHY layer based on OFDM, OFDMA, and/or SC-FDMA technologies, such as described herein with respect to other figures.

In some exemplary embodiments, the radio transceiver 1640 includes an LTE transmitter and receiver that can facilitate the device 1600 to communicate with various LTE LTE-Advanced (LTE-A), and/or NR networks according to standards promulgated by 3GPP. In some exemplary embodiments of the present disclosure, the radio transceiver 1640 includes circuitry, firmware, etc. necessary for the device 1600 to communicate with various 5G/NR, LTE, LTE-A, UMTS, and/or GSM/EDGE networks, also according to 3GPP standards. In some exemplary embodiments of the present disclosure, radio transceiver 1640 includes circuitry, firmware, etc. necessary for the device 1600 to communicate with various CDMA2000 networks, according to 3GPP2 standards.

In some exemplary embodiments of the present disclosure, the radio transceiver 1640 is capable of communicating using radio technologies that operate in unlicensed frequency bands, such as IEEE 802.11 WiFi that operates using frequencies in the regions of 2.4, 5.6, and/or 60 GHz. In some exemplary embodiments of the present disclosure, radio transceiver 1640 can comprise a transceiver that is capable of wired communication, such as by using IEEE 802.3 Ethernet technology. The functionality particular to each of these embodiments can be coupled with or controlled by other circuitry in the device 1600, such as the processor 1610 executing program code stored in program memory 1620 in conjunction with, or supported by, data memory 1630.

User interface 1650 can take various forms depending on the particular embodiment of device 1600, or can be absent from device 1600 entirely. In some exemplary embodiments, user interface 1650 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1600 can comprise a tablet computing device including a larger touchscreen display. In such embodiments, one or more of the mechanical features of the user interface 1650 can be replaced by comparable or functionally equivalent virtual user interface features (e.g., virtual keypad, virtual buttons, etc.) implemented using the touchscreen display, as familiar to persons of ordinary skill in the art. In other embodiments, the device 1600 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1600 having a touch screen display are capable of receiving user inputs, such as inputs related to exemplary methods and/or procedures described herein or otherwise known to persons of ordinary skill in the art.

In some exemplary embodiments of the present disclosure, device 1600 can comprise an orientation sensor, which can be used in various ways by features and functions of device 1600. For example, the device 1600 can use outputs of the orientation sensor to determine when a user has changed the physical orientation of the device 1600's touch screen display. An indication signal from the orientation sensor can be available to any application program executing on the device 1600, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1660 of the device 1600 can take various forms depending on the particular exemplary embodiment of device 1600 and of the particular interface requirements of other devices that the device 1600 is intended to communicate with and/or control. For example, the control interface 1660 can comprise an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1660 can comprise an IEEE 802.3 Ethernet interface such as described above. In some exemplary embodiments of the present disclosure, the control interface 1660 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1600 can comprise more functionality than is shown in FIG. 16 including, for example, a video and/or still-image camera, microphone, media player and/or recorder, etc. Moreover, radio transceiver 1640 can include circuitry necessary to communicate using additional radio-frequency communication standards including Bluetooth, GPS, and/or others. Moreover, the processor 1610 can execute software code stored in the program memory 1620 to control such additional functionality. For example, directional velocity and/or position estimates output from a GPS receiver can be available to any application program executing on the device 1600, including various exemplary methods and/or computer-readable media according to various exemplary embodiments of the present disclosure.

Figure 17:
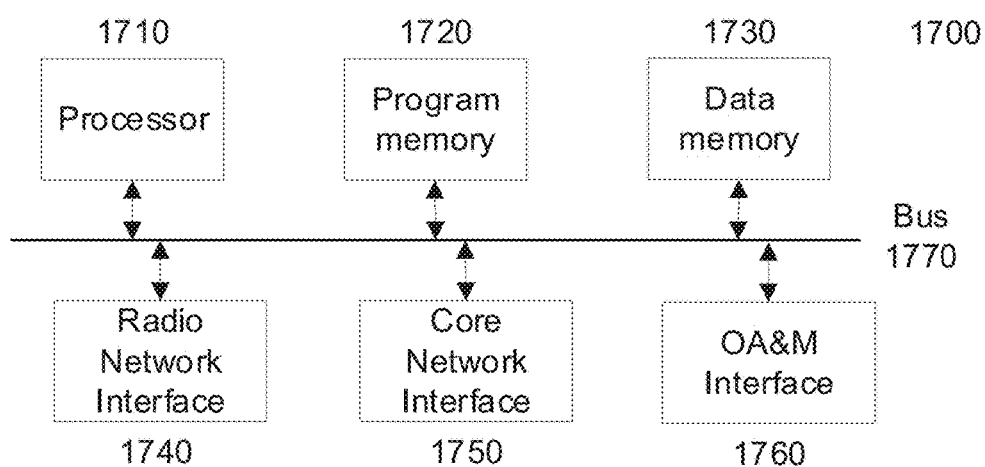
FIG. 17 illustrates a block diagram of an exemplary network node configurable according to various embodiments.

FIG. 17 shows a block diagram of an exemplary network node 1700 configurable according to various embodiments of the present disclosure, including those described above with reference to other figures. In some exemplary embodiments, network node 1700 can comprise a base station, eNB, gNB, or component thereof. Network node 1700 comprises processor 1710 which is operably connected to program memory 1720 and data memory 1730 via bus 1770, which can comprise parallel address and data buses, serial ports, or other methods and/or structures known to those of ordinary skill in the art.

Program memory 1720 comprises software code (e.g., program instructions) executed by processor 1710 that can configure and/or facilitate network node 1700 to communicate with one or more other devices using protocols according to various embodiments of the present disclosure, including one or more exemplary methods and/or procedures discussed above. Program memory 1720 can also comprise software code executed by processor 1710 that can facilitate and specifically configure network node 1700 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1740 and core network interface 1750. By way of example and without limitation, core network interface 1750 can comprise the S1 interface and radio network interface 1750 can comprise the Uu interface, as standardized by 3GPP. Program memory 1720 can further comprise software code executed by processor 1710 to control the functions of network node 1700, including configuring and controlling various components such as radio network interface 1740 and core network interface 1750.

Data memory 1730 can comprise memory area for processor 1710 to store variables used in protocols, configuration, control, and other functions of network node 1700. As such, program memory 1720 and data memory 1730 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1710 can comprise multiple individual processors (not shown), each of which implements a portion of the functionality described above. In such case, multiple individual processors may be commonly connected to program memory 1720 and data memory 1730 or individually connected to multiple individual program memories and/or data memories. More generally, persons of ordinary skill in the art will recognize that various protocols and other functions of network node 1700 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1740 can comprise transmitters, receivers, signal processors, ASICs, antennas, beamforming units, and other circuitry that enables network node 1700 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1740. According to further exemplary embodiments of the present disclosure, the radio network interface 1740 can comprise a PHY layer based on OFDM, OFDMA, and/or SC-FDMA technologies. In some embodiments, the functionality of such a PHY layer can be provided cooperatively by radio network interface 1740 and processor 1710 (including program code in memory 1720).

Core network interface 1750 can comprise transmitters, receivers, and other circuitry that enables network node 1700 to communicate with other equipment in a core network such as, in some embodiments, circuit-switched (CS) and/or packet-switched Core (PS) networks. In some embodiments, core network interface 1750 can comprise the S1 interface standardized by 3GPP. In some exemplary embodiments, core network interface 1750 can comprise one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1750 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1760 can comprise transmitters, receivers, and other circuitry that enables network node 1700 to communicate with external networks, computers, databases, and the like for purposes of operations, administration, and maintenance of network node 1700 or other network equipment operably connected thereto. Lower layers of OA&M interface 1760 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1740, core network interface 1750, and OA&M interface 1760 may be multiplexed together on a single physical interface, such as the examples listed above.

Figure 18:
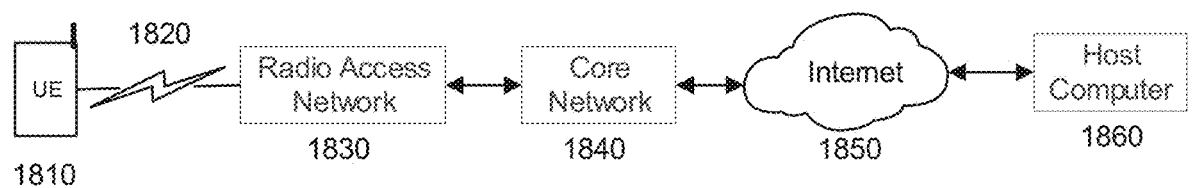
FIG. 18 illustrates a block diagram of an exemplary network configuration usable to provide over-the-top (OTT) data services between a host computer and a UE, according to one or more exemplary embodiments.

FIG. 18 is a block diagram of an exemplary network configuration usable to provide over-the-top (OTT) data services between a host computer and a user equipment (UE), according to one or more exemplary embodiments of the present disclosure, UE 1810 can communicate with radio access network (RAN) 1830 over radio interface 1820, which can be based on protocols described above including, e.g., LTE, LTE-A, and 5G/NR. RAN 1830 can include one or more network nodes (e.g., base stations, eNBs, gNBs, controllers, etc.). RAN 1830 can further communicate with core network 1840 according to various protocols and interfaces described above. For example, one or more apparatus (e.g., base stations, eNBs, gNBs, etc.) comprising RAN 1830 can communicate to core network 1840 via core network interface 1650 described above. In some exemplary embodiments, RAN 1830 and core network 1840 can be configured and/or arranged as shown in other figures discussed above. Similarly, UE 1810 can also be configured and/or arranged as shown in other figures discussed above.

Core network 1840 can further communicate with an external packet data network, illustrated in FIG. 18 as Internet 1850, according to various protocols and interfaces known to persons of ordinary skill in the art. Many other devices and/or networks can also connect to and communicate via Internet 1850, such as exemplary host computer 1860. In some exemplary embodiments, host computer 1860 can communicate with UE 1810 using Internet 1850, core network 1840, and RAN 1830 as intermediaries. Host computer 1860 can be a server (e.g., an application server) under ownership and/or control of a service provider. Host computer 1860 can be operated by the OTT service provider or by another entity on the service provider's behalf.

For example, host computer 1860 can provide an over-the-top (OTT) packet data service to UE 1810 using facilities of core network 1840 and RAN 1830, which can be unaware of the routing of an outgoing/incoming communication to/from host computer 1860. Similarly, host computer 1860 can be unaware of routing of a transmission from the host computer to the UE, e.g., the routing of the transmission through RAN 1830. Various OTT services can be provided using the exemplary configuration shown in FIG. 18 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 18 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments provide a flexible approach for selecting multiple TAGs with closed loop TA on an as-needed basis, which can allow support for implementations that cannot meet strict TAE between f2 and f3 base stations and also allow for tradeoffs between multiple TAGs and the potential need for a guard period in a SUL TDM sharing scheme. The exemplary embodiments can also reduce effects of the $T_{e\ \Delta Channel\ SUL\text{-}NR}$ UL error (environment and frequency dependent) that otherwise could contribute to additional spread and errors within the SUL UL between different SUL UEs and might not fit into a timing budget for certain implementations. As such, the improvements, as described herein, can play a critical role by enabling UE 1810 and RAN 1830 to meet the requirements of the particular OTT service between host computer 1860 and UE 1810. These techniques improve data throughput in a coverage area and enable a greater number of users to utilize data-intensive services such as streaming video in various coverage conditions without excessive power consumption or other degradations to user experience.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms can be employed herein, they are used in a generic and descriptive sense only and not for purposes of limitation.

The invention claimed is:

1. A method of adjusting the transmission timing of a wireless communication device operating in a wireless communication network comprising first and second base stations, the method comprising:
   determining a first allowable timing adjustment range corresponding to a first uplink (UL) connection between the wireless communication device and the first base station, wherein the first UL connection is associated with a first downlink (DL) connection between the wireless communication device and the first base station;
   determining a second allowable timing adjustment range corresponding to a supplementary uplink (SUL) connection between the wireless communication device and the second base station, wherein the SUL connection is not associated with a DL connection between the wireless communication device and the second base station;
   determining if a single timing advance (TA) value can be used to adjust the wireless communication device's transmission timing to satisfy both the first allowable timing adjustment range and the second allowable timing adjustment range; and
   performing a corrective action if it is determined that said single TA value cannot be used.

2. The method of claim 1, wherein:
   the first allowable timing adjustment range is determined based on a current timing misalignment and an allowed further timing misalignment, both associated with the wireless communication device's transmission timing for the UL connection; and
   the second allowable timing adjustment range is determined based on a current timing misalignment and an allowed further timing misalignment, both associated with the wireless communication device's transmission timing for the SUL connection.

3. The method of claim 1, wherein:
   the first allowable timing adjustment range is based on the duration of first cyclic prefix (CP) associated with the UL connection; and
   the second allowable timing adjustment range is based on the duration of second CP associated with the SUL connection.

4. The method of claim 1, further comprising, if it is determined that said single TA value can be used:
   selecting a particular single TA value; and
   sending the selected particular TA value to the wireless communication device via the DL connection.

5. The method of claim 4, wherein:
   the UL connection utilizes a first sub-carrier spacing (SCS);
   the SUL connection utilizes a second SCS; and
   the resolution of the selected particular TA value is determined based on larger of the first SCS and the second SCS.

6. The method of claim 1, wherein:
   the method is performed by the first base station; and
   determining the second allowable timing adjustment range is based on information identifying the second allowable timing adjustment range received by the first base station from the second base station.

7. The method of claim 1, wherein performing the corrective action comprises:
   selecting a first TA value that satisfies the first allowable timing adjustment range;
   selecting a second TA value that satisfies the second allowable timing adjustment range; and
   sending the selected first and second TA values to the wireless communication device via the DL connection.

8. The method of claim 7, wherein:
   the method is performed by the second base station;
   determining the first allowable timing adjustment range is based on information identifying the first allowable timing adjustment range received by the second base station from the first base station; and
   performing the corrective action comprises sending the selected first and second TA values to the first base station.

9. A second base station configured to have a supplementary uplink (SUL) connection to a wireless communication device, the second base station comprising:
   communication circuitry configured for communicating with a first base station and one or more wireless communication devices; and
   processing circuitry operatively associated with the communication circuitry and configured to perform operations corresponding to the method of claim 8.

10. A non-transitory computer-readable medium storing computer-executable instructions that, when executed by at least one processor of a second base station configured to have a supplementary uplink (SUL) connection with a wireless communication device in a wireless communication network, configure the second base station to perform operations corresponding to the method of claim 8.

11. The method of claim 1, wherein:
    the method is performed by the first base station; and
    performing the corrective action comprises:
       disabling the SUL connection;
       selecting a particular single TA value that satisfies the first allowable timing adjustment range; and
       sending the selected particular TA value to the wireless communication device via the DL connection.

12. The method of claim 1, wherein:
    the second base station is configured to frequency-division multiplex (FDM) the SUL connection with further UL connections associated with further wireless communication devices; and
    performing the corrective action comprises configuring the second base station to separate receive processing for the SUL connection and the further UL connections.

13. The method of claim 1, wherein:
    the second base station is configured to time-division multiplex (TDM) the SUL connection with further UL connections associated with further wireless communication devices; and
    performing the corrective action comprises configuring the second base station to add or increase a guard period (GP) between transmissions of the SUL connection and transmissions of the further UL connections.

14. The method of claim 1, wherein performing the corrective action comprises disabling the SUL connection between the wireless communication device and the second base station.

15. The method of claim 14, wherein disabling the SUL connection is performed after determining that one or more further corrective actions are unavailable.

16. The method of claim 15, wherein the one or more further corrective actions include selecting respective first and second TA values that satisfy the respective first and second allowable timing adjustment ranges, and further include configuring the second base station to perform one of the following:
- add or increase a guard period (GP) between transmissions of the SUL connection and transmissions of the further UL connections; and
- separate a receive processing for the SUL connection from a receive processing for one or more further UL connections.

17. A first base station configured to have downlink (DL) and uplink (UL) connections to one or more wireless communication devices, comprising:
- communication circuitry configured for communicating with a second base station and with the one or more wireless communication devices; and
- processing circuitry operatively associated with the communication circuitry and configured to perform operations corresponding to the method of claim 1.

18. A non-transitory, computer readable medium storing computer-executable instructions that, when executed by at least one processor of a first base station configured for downlink DL, and uplink (UL) connections to one or more wireless communication devices, configure the first base station to perform operations corresponding to the method of claim 1.

19. A method of operating a first base station in a wireless communication network that also includes a second base station, the method comprising:
- determining a first timing advance (TA) value usable to adjust a wireless communication device's transmission timing for an uplink (UL) connection with the first base station, wherein the UL connection is associated with a downlink (DL) connection between the wireless communication device and the first base station;
- receiving, from the second base station, a second TA value usable to adjust the wireless communication device's transmission timing for a supplementary UL (SUL) connection with the second base station, wherein the SUL connection is not associated with a DL connection between the wireless communication device and the second base station; and
- transmitting the first TA value and the second TA value to the wireless communication device via the DL connection.

20. A method of operating a wireless communication device in communication with first and second base stations in a wireless communication network, the method comprising:
- performing one or more transmissions on an uplink (UL) connection with the first base station, wherein the UL connection is associated with a downlink (DL) connection between the wireless communication device and the first base station;
- performing one or more transmissions on a supplementary UL (SUL) connection with the second base station, wherein the SUL connection is not associated with a DL connection between the wireless communication device and the second base station; and
- receiving, via the DL connection with the first base station, at least one timing advance (TA) value usable to adjust the wireless communication device's transmission timing for the UL connection and the SUL connection.

21. The method of claim 20, wherein the at least one TA value comprises a single TA value usable to adjust the wireless communication device's transmission timing for the both the UL connection and the SUL connection.

22. The method of claim 20, wherein the at least one TA value comprises:
- a first TA value usable to adjust the wireless communication device's transmission timing for the UL connection; and
- a second TA value usable to adjust the wireless communication device's transmission timing for the SUL connection.

23. A wireless communication device configured to have downlink (DL) and uplink (UL) connections to a first base station, and configured to have a supplementary UL (SUL) connection to a second base station, the wireless communication device comprising:
- communication circuitry configured for communicating with the first and second base stations; and
- processing circuitry operatively associated with the communication circuitry and configured to perform operations corresponding to the method of claim 20.

24. A non-transitory, computer readable medium storing computer-executable instructions that, when executed by at least one processor of a wireless communication device configured to have downlink (DL) and uplink (UL) connections to a first base station and to have a supplementary UL (SUL) connection to a second base station, configure the wireless communication device to perform operations corresponding to the method of claim 20.

25. A method of operating a second base station in a wireless communication network that also includes a first base station, the method comprising:
- receiving one or more transmissions on a supplementary uplink (SUL) connection with a wireless communication device, wherein the SUL connection is:
  - supplementary to an uplink (UL) connection between the first base station and the wireless communication device, and
  - not associated with a DL connection with the wireless communication device;
- determining a second timing advance (TA) value usable to adjust the wireless communication device's transmission timing on the SUL connection;
- transmitting, to the first base station, the second TA value; and
- receiving, from the first base station, a message configuring the second base station to perform at least one corrective action with respect to the SUL connection.

26. The method of claim 25, wherein:
- the second base station is configured to frequency-division multiplex (FDM) the SUL connection with further UL connections associated with further wireless communication devices; and
- the message configures the second base station to separate receive processing for the SUL connection and the further UL connections.

27. The method of claim 25, wherein:
- the second base station is configured to time-division multiplex (TDM) the SUL connection with further UL connections associated with further wireless communication devices; and the message configures the second base station to add or increase a guard period (GP) between transmissions of the SUL connection and transmissions of the further UL connections.

28. The method of claim 25, wherein the message configures the second base station to disable the SUL connection between the wireless communication device and the second base station.

29. The method of claim 28, wherein the message configures the second base station to disable the SUL connection provided that the second base station first determines that one or more further corrective actions are unavailable.

30. The method of claim 29, wherein the one or more further corrective actions include selecting respective first and second TA values that satisfy the respective first and second allowable timing adjustment ranges, and further includes one of the following:
- add or increase a guard period (GP) between transmissions of the SUL connection and transmissions of the further UL connections; and
- separate a receive processing for the SUL connection from a receive processing for one or more further UL connections.

\* \* \* \* \*